(12) United States Patent
Kim

(10) Patent No.: US 11,151,348 B2
(45) Date of Patent: Oct. 19, 2021

(54) METHOD AND APPARATUS FOR PROCESSING IMAGE DATA

(71) Applicant: SAMSUNG ELECTRONICS CO., LTD., Suwon-si (KR)

(72) Inventor: Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/291,052

(22) Filed: Mar. 4, 2019

(65) Prior Publication Data

US 2020/0019744 A1   Jan. 16, 2020

(30) Foreign Application Priority Data

Jul. 13, 2018  (KR) .......................... 10-2018-0081754

(51) Int. Cl.
  *G06K 9/00*   (2006.01)
  *G06T 7/00*   (2017.01)
(52) U.S. Cl.
  CPC ....... *G06K 9/0002* (2013.01); *G06K 9/00067* (2013.01); *G06T 7/0012* (2013.01); *G06T 2207/30088* (2013.01)
(58) Field of Classification Search
  CPC ...... G06F 3/044; G06F 3/0414; G06F 3/0412; G06F 3/0416
  See application file for complete search history.

(56) References Cited

U.S. PATENT DOCUMENTS

| | | | | |
|---|---|---|---|---|
| 6,252,989 B1* | 6/2001 | Geisler | ................ | H04N 19/176 345/555 |
| 6,442,297 B1* | 8/2002 | Kondo | .................... | G06T 9/007 375/240.11 |
| 8,134,613 B2 | 3/2012 | Kondo et al. | | |
| 2012/0261199 A1* | 10/2012 | Kuo | ....................... | G06F 3/0416 178/18.06 |
| 2016/0162011 A1* | 6/2016 | Verma | ............... | G06F 3/041661 345/173 |
| 2016/0162102 A1* | 6/2016 | Shahparnia | ......... | G06F 3/04162 345/174 |

(Continued)

FOREIGN PATENT DOCUMENTS

| | | |
|---|---|---|
| EP | 3287941 A1 | 2/2018 |
| JP | 2002-312782 A | 10/2002 |

(Continued)

OTHER PUBLICATIONS

Communication dated Nov. 12, 2019, from the European Patent Office in counterpart European Application No. 19167317.7.

*Primary Examiner* — Yuzhen Shen
(74) *Attorney, Agent, or Firm* — Sughrue Mion, PLLC

(57) ABSTRACT

A method and an apparatus for converting image data of a super-pixel array into image data a sub-pixel array are provided. A plurality of nodes in a separate activation area on a sensing circuit are activated to obtain a plurality of super-pixels and to generate image data of a super-pixel array including the plurality of super-pixels. Also, one or more nodes in an integrated activation area are separately activated to obtain values of sub-pixels in a first area of a sub-pixel array, and based on the super-pixel array and the values of the sub-pixels in the first area, the image data of the super-pixel array is converted into image data of the sub-pixel array.

19 Claims, 22 Drawing Sheets

(56) References Cited

U.S. PATENT DOCUMENTS

| | | |
|---|---|---|
| 2016/0286108 A1 | 9/2016 | Fettig et al. |
| 2017/0046555 A1 | 2/2017 | Lee |
| 2018/0054086 A1 | 2/2018 | Jung |
| 2018/0060636 A1 | 3/2018 | Hong et al. |
| 2018/0164915 A1* | 6/2018 | Karpin .................... G06F 3/044 |

FOREIGN PATENT DOCUMENTS

| | | |
|---|---|---|
| JP | 4731971 B2 | 7/2011 |
| KR | 10-2016-0107776 A | 9/2016 |
| KR | 10-2018-0022391 A | 3/2018 |

* cited by examiner

2X2 SUPER-PIXEL ARRAY

4X4 SUB-PIXEL ARRAY

3X3 SUB-PIXEL ARRAY

4X4 SUB-PIXEL ARRAY

METHOD AND APPARATUS FOR PROCESSING IMAGE DATA

CROSS-REFERENCE TO RELATED APPLICATION

This application claims priority from Korean Patent Application No. 10-2018-0081754, filed on Jul. 13, 2018 in the Korean Intellectual Property Office, the disclosure of which is incorporated herein by reference in its entirety.

BACKGROUND

1. Field

Apparatuses and methods consistent with exemplary embodiments relate to processing image data, such as a fingerprint image.

2. Description of the Related Art

The necessity of personal authentication using a unique characteristic of an individual, such as a fingerprint, voice, face, hand, or iris, has gradually increased. While personal authentication is mainly used for banking machines, access control machines, mobile devices, notebook computers, etc., recently, due to the wide distribution of mobile devices, such as smartphones, fingerprint recognition devices have been developed for personal authentication in order to protect security information stored on such mobile devices.

With demand for increased accuracy for fingerprint sensing, a fingerprint sensing device having high resolution and sensitivity has been required.

SUMMARY

One or more exemplary embodiments provide a method and an apparatus for processing image data.

According to an aspect of an exemplary embodiment, there is a method of processing image data generated from a sensing circuit including a plurality of driving electrodes and a plurality of detection electrodes. The method of processing image data may include: obtaining image data of a super-pixel array comprising a plurality of super-pixels by activating a plurality of nodes that are formed at intersections between the plurality of driving electrodes and the plurality of detecting electrodes in an activation area of the sensing circuit, and moving the activation area on the sensing circuit by a predetermined pitch; obtaining values of a plurality of first sub-pixels included in a first area of a sub-pixel array by separately activating the plurality of nodes in an integrated activation area of the sensing circuit, wherein a plurality of sub-pixels in the sub-pixel array respectively correspond to the plurality of nodes in the integrated activation area; and converting the image data of the super-pixel array into image data of the sub-pixel array, by calculating values of a plurality of second sub-pixels included in a second area of the sub-pixel array based on the super-pixel array and the values of the plurality of first sub-pixels.

The calculating of the values of the plurality of second sub-pixels may include: determining a size of a relationship matrix representing a relationship between the plurality of super-pixels and the plurality of sub-pixels, based on a number of the plurality of super-pixels included in the super-pixel array and a number of the plurality of sub-pixels included in the sub-pixel array; determining the relationship matrix having the determined size, by identifying the plurality of nodes in the activation area, when the activation area is moved in the integrated activation area by the predetermined pitch; and calculating the values of the plurality of second sub-pixels based on the super-pixel array, the values of the plurality of first sub-pixels, and the determined relationship matrix.

The determining of the relationship matrix may include: identifying the plurality of nodes in the activation area by moving the activation area in the integrated activation area by the predetermined pitch; and determining a plurality of matrix elements of the relationship matrix that respectively correspond to the identified plurality of nodes in the integrated activation area.

The values of the plurality of first sub-pixels may be 0.

The obtaining of the image data of the super-pixel array may include: selecting at least one node from among the plurality of nodes in the activation area, the at least one node corresponding to the plurality of second sub-pixels, by moving the activation area in the integrated activation area by the predetermined pitch; obtaining the plurality of super-pixels by activating only the at least one selected node from among the plurality of nodes in the activation area; and generating the image data of the super-pixel array comprising the obtained plurality of super-pixels.

The obtaining of the image data of the super-pixel array may include: sequentially applying electrical signals to a plurality of driving groups of the plurality of driving electrodes, and sequentially detecting electrical signals from a plurality of detection groups of the plurality of detection electrodes; and obtaining the plurality of super-pixels by activating the plurality of nodes, at which each of the plurality of driving groups and each of the plurality of detecting groups cross each other, and generating the image data of the super-pixel array comprising the plurality of super-pixels.

The plurality of nodes may be formed by the plurality of driving electrodes and the plurality of detection electrodes crossing one another, the plurality of driving electrodes and the plurality of detection electrodes being included in the sensing circuit, and each of the plurality of nodes may indicate a mutual capacitance between each of the driving electrodes and each of the detection electrodes.

According to an aspect of another exemplary embodiment, there is provided an apparatus for processing image data generated from a sensing circuit including a plurality of driving electrodes and a plurality of detection electrodes, the apparatus including: a memory storing at least one program; and at least one processor configured to execute the at least one program to control the sensing circuit, wherein the at least one processor may be further configured to: obtain image data of a super-pixel array comprising a plurality of super-pixels by activating a plurality of nodes that are formed at intersections between the plurality of driving electrodes and the plurality of detecting electrodes in a activation area of the sensing circuit, and moving the activation area on the sensing circuit by a predetermined pitch; obtain values of a plurality of first sub-pixels included in a first area of a sub-pixel array by separately activating the plurality of nodes in an integrated activation area of the sensing circuit, wherein a plurality of sub-pixels included in the sub-pixel array respectively correspond to the plurality of nodes in the integrated activation area; and convert the image data of the super-pixel array into image data of the sub-pixel array, by calculating values of a plurality of second sub-pixels included in a second area of the sub-pixel array based on the super-pixel array and the values of the plurality of first sub-pixels.

The at least one processor may be further configured to: determine a size of a relationship matrix representing a relationship between the plurality of super-pixels and the plurality of sub-pixels, based on a number of the super-pixels included in the super-pixel array and a number of the sub-pixels included in the sub-pixel array; determine the relationship matrix having the determined size, by identifying the plurality of nodes in the activation area, when the activation area is moved in the integrated activation area by the predetermined pitch; and calculate the values of the plurality of second sub-pixels based on the super-pixel array, the values of the plurality of first sub-pixels, and the determined relationship matrix.

The at least one processor may be further configured to: identify the plurality of nodes in the activation area by moving the activation area in the integrated activation area by the predetermined pitch; and determine a plurality of matrix elements of the relationship matrix that respectively correspond to the identified plurality of nodes in the integrated activation area.

The values of the plurality of first sub-pixels may be 0.

The at least one processor may be further configured to: select at least one node from among the plurality of nodes in the activation area, the at least one node corresponding to the plurality of second sub-pixels, by moving the activation area in the integrated activation area by the predetermined pitch; obtain the plurality of super-pixels by activating only the at least one selected node from among the plurality of nodes in the activation area; and generate the image data of the super-pixel array comprising the obtained plurality of super-pixels.

The at least one processor may be further configured to: control to sequentially apply electrical signals to a plurality of driving groups of the plurality of driving electrodes, and control to sequentially detect electrical signals from a plurality of detection groups of the plurality of detection electrodes; and obtain the plurality of super-pixels by activating the plurality of nodes, at which each of the plurality of driving groups and each of the plurality of detecting groups cross each other, and generate the image data of the super-pixel array comprising the plurality of super-pixels.

The plurality of nodes may be formed by the plurality of driving electrodes and the plurality of detection electrodes crossing one another, the plurality of driving electrodes and the plurality of detection electrodes being included in the sensing circuit. Each of the plurality of nodes may indicate a mutual capacitance between each of the driving electrodes and each of the detection electrodes.

The sensing circuit may include: a touch pad comprising the plurality of driving electrodes and the plurality of detection electrodes formed in a direction crossing the plurality of driving electrodes; a driver unit configured to apply a driving signal to the plurality of driving electrodes; and a signal receiving unit configured to measure an electrical signal from the plurality of detection electrodes, wherein the at least one processor may be further configured to convert the image data of the super-pixel array into the image data of the sub-pixel array, based on the electrical signal measured by the signal receiving unit.

According to an aspect of another exemplary embodiment, there is provided a non-transitory computer-readable storage medium storing a program that is executable by a computer to perform the method of processing the image data generated from the sensing circuit According to an aspect of another exemplary embodiment, there is provided a fingerprint sensor including: a plurality of driving electrodes; a plurality of detection electrodes; a plurality of nodes formed at intersections between the plurality of driving electrodes and the plurality of detection electrodes; and a processor configured to: obtain values of a super-pixel array by measuring capacitances at a plurality of activated nodes in an activation area, among the plurality of nodes in an integrated activation area while changing the activation area in the integration activation area; and obtain values of a sub-pixel array based on the values of the super-pixel array, and a relationship matrix indicating a relationship between a plurality of super-pixels in the super-pixel array and a plurality of sub-pixels in the sub-pixel array.

The processor may be further configured to determine a size of the relationship matrix based on a number of the super-pixels included in the super-pixel array and a number of the sub-pixels included in the sub-pixel array.

When a number of the plurality of driving electrodes is expressed as M+p−1 and a number of the plurality of detection electrodes is expressed as N+q+1, the super-pixel array has a M×N array, the sub-pixel array has a (M+p−1)×(N+q−1) array, and the relationship between the plurality of super-pixels in the super-pixel array and the plurality of sub-pixels in the sub-pixel array has (M×N)×[(M+p−1)×(N+q−1)] array, and wherein each of M, p, N, q denotes a natural number that is greater than or equal to 2, M is greater than p, and N is greater than q.

The processor may be further configured to: drive a p−1 number of driving electrodes among the plurality of driving electrodes and detect signals from a q−1 number of detection electrodes among the plurality of detection electrodes, to obtain first sub-pixel image data having a (M+p−1)×(q−1) array and second sub-pixel image data having a (q−1)×(N+q−1) array; and obtain the values of the sub-pixel array based on the first sub-pixel image data and the second sub-pixel image data.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
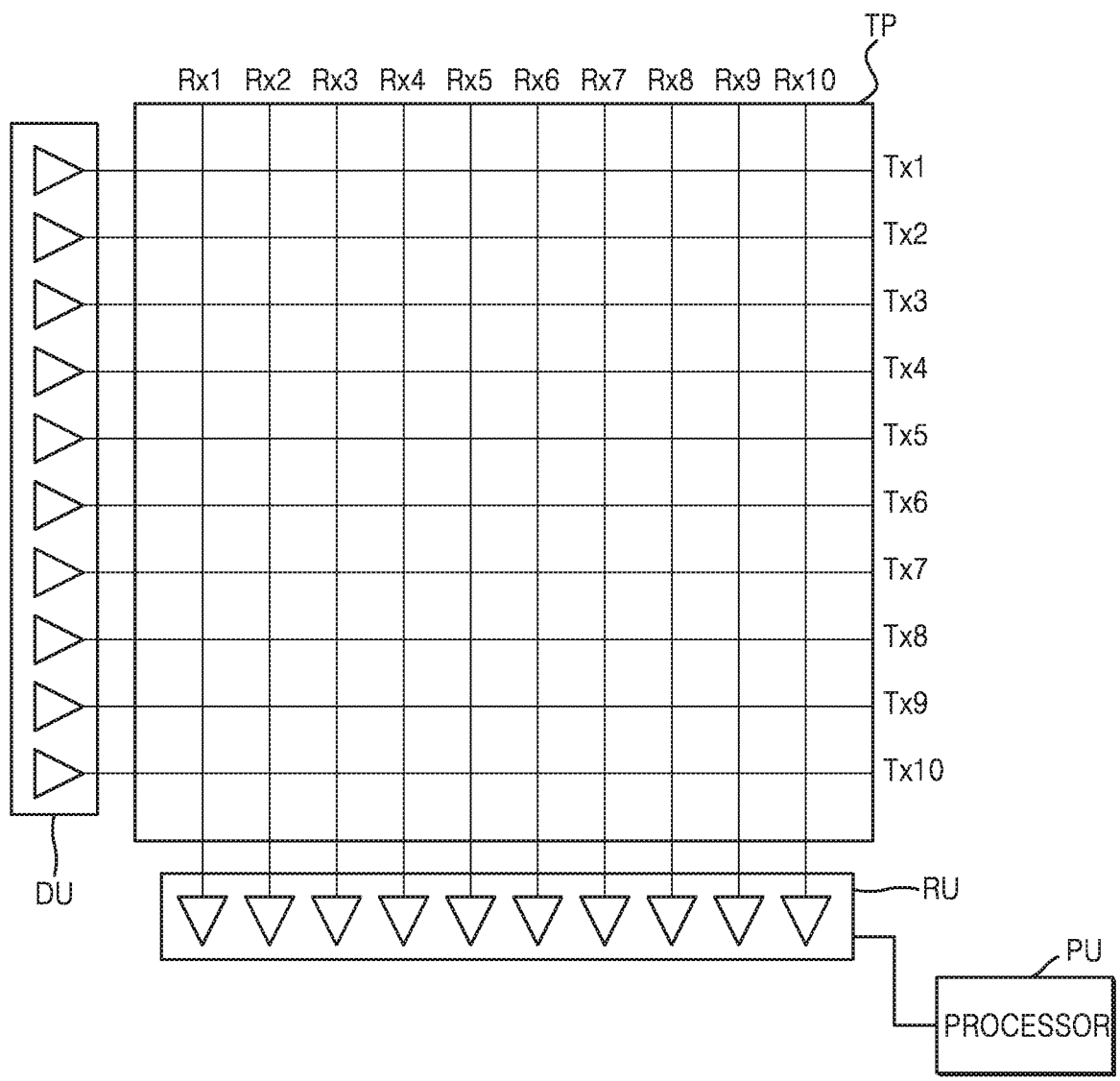
FIG. 1 is a schematic structure of a sensing circuit according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The expression, such as "in some embodiments," "according to an embodiment," or the like, used in various places in the present specification, do not necessarily refer to the same embodiments.

One or more embodiments of the present disclosure may be described in terms of functional block components and various processing steps. A part or all of such functional blocks may be realized by any number of hardware and/or software components configured to perform the specified functions. For example, the functional blocks of the present disclosure may be realized by one or more microprocessors, or circuit structures configured to perform certain functions. Also, for example, the functional blocks of the present disclosure may be implemented with various programming or scripting languages. The functional blocks may be implemented with various algorithms being implemented by one or more processors. Furthermore, the present disclosure could employ conventional techniques for electronics configuration, signal processing and/or data processing, and the like. The words "mechanism," "element," "device," "component," etc. are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Also, it will be understood that, although the terms first, second, etc. may be used herein to describe various elements, these elements should not be limited by these terms. These terms are only used to distinguish one element from another.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a schematic structure of a sensing circuit according to an exemplary embodiment.

Referring to FIG. 1, the sensing circuit according to an exemplary embodiment may include a touch pad TP including a plurality of driving electrodes Tx and a plurality of detection electrodes Rx formed in a direction intersecting with the plurality of driving electrodes Tx. Also, the sensing circuit may include a driver unit DU applying a driving signal to the plurality of driving electrodes TX and a signal receiving unit RU measuring an electrical signal from the plurality of detection electrodes Rx.

The touch pad TP may include the plurality of driving electrodes Tx and the plurality of detection electrodes Rx. Each of the plurality of driving electrodes Tx and the plurality of detection electrodes Rx may be formed in a direction intersecting with each other. Referring to FIG. 1, the plurality of driving electrodes Tx and the plurality of detection electrodes Rx cross one another at right angles, however, the present embodiment is not limited thereto. For example, an angle between a direction in which the plurality of driving electrodes Tx are formed and an direction in which the plurality of detection electrodes Rx are formed may an acute angle that is smaller than ninety (90) degrees, or an obtuse angle that is larger than 90 degrees.

When a finger of a user approaches close to the touch pad TP and/or contacts the touch pad TP, a mutual capacitance between each of the plurality of driving electrodes Tx and each of the plurality of detection electrodes Rx of the touch pad TP may change. For example, according to a shape of a pattern of a fingerprint of the user, the mutual capacitance at each of nodes at which the plurality of driving electrodes Tx and the plurality of detection electrodes Rx cross each other may change differently. A resolution of the sensing circuit may increase when distances between the plurality of driving electrodes Tx or distances between the plurality of detection electrodes Rx are decreased. A protection layer for protecting the plurality of driving electrodes Tx and the plurality of detection electrodes Rx, included in the touch pad TP, may further be provided on the touch pad TP.

In an exemplary embodiment, the plurality of driving electrodes Tx and the plurality of detection electrodes Rx may be formed as line electrodes. In another exemplary embodiment, each of the plurality of driving electrodes Tx may further include certain patterns provided between the nodes at which the plurality of driving electrodes Tx and the plurality of detection electrodes Rx cross each other. The patterns may have various shapes, such as a polygonal shape, a circular shape, etc., but are not limited thereto. Likewise, each of the plurality of detection electrodes Rx may further include certain patterns provided between the nodes at which the plurality of driving electrodes Tx and the plurality of detection electrodes Rx cross each other.

The driver unit DU may apply driving signals to the plurality of driving electrodes Tx. In an exemplary embodiment, the driver unit DU may apply voltage pulses to the plurality of driving electrodes Tx. The signal receiving unit RU may measure an electrical signal from the plurality of detection electrodes Rx. In an exemplary embodiment, the signal receiving unit RU may measure currents flowing through the plurality of detection electrodes Rx. In another exemplary embodiment, the signal receiving unit RU may measure potentials of the plurality of detection electrodes Rx.

The sensing circuit may be applied to a mutual capacitive-type fingerprint sensor. However, the sensing circuit may be also applied to other devices.

Figure 2:
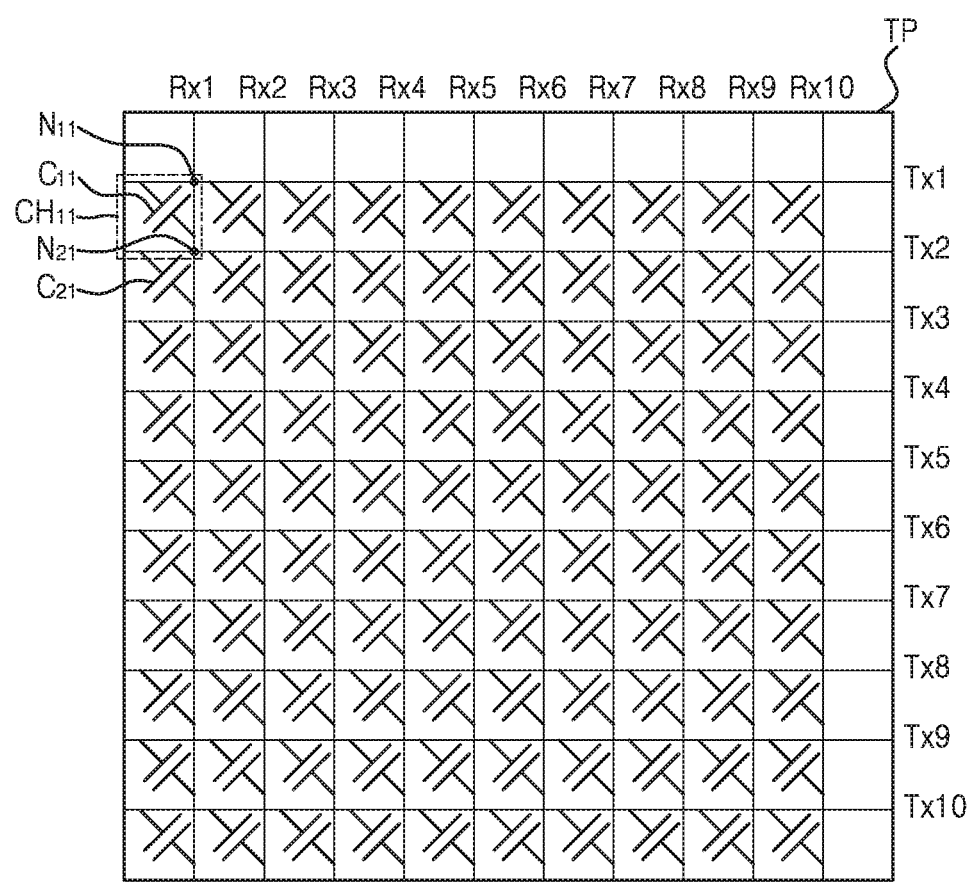
FIG. 2 is a conceptual diagram for explaining mutual capacitances respectively corresponding to nodes of a touch pad, according to an exemplary embodiment.

FIG. 2 is a conceptual diagram for explaining a mutual capacitance corresponding to each of nodes of the touch pad TP, according to an exemplary embodiment.

Referring to FIG. 2, the mutual capacitance between each of the plurality of driving electrodes Tx and each of the plurality of detection electrodes Rx may correspond to the node at which each of the plurality of driving electrodes Tx and each of the plurality of detection electrodes Rx cross each other.

In an exemplary embodiment, a mutual capacitance C11 between a first driving electrode Tx1 and a first detection electrode Rx1 may correspond to a node N11 at which the first driving electrode Tx1 and the first detection electrode Rx1 cross each other. Likewise, a mutual capacitance Cmn between an $m^{th}$ (m is an arbitrary natural number) driving electrode Txm and an $n^{th}$ (n is an arbitrary natural number) detection electrode Rxn may correspond to a node Nmn at which the $m^{th}$ driving electrode Txm and the $n^{th}$ detection electrode Rxn cross each other. In the present specification, the mutual capacitance Cmn at the node Nmn may denote a mutual capacitance between the $m^{th}$ driving electrode Txm and the $n^{th}$ detection electrode Rxn.

A plurality of channel areas may be defined on the touch pad TP by the plurality of driving electrodes Tx and the plurality of detection electrodes Rx. For example, the channel areas may be quadrangular areas surrounded by the plurality of driving electrodes Tx and the plurality of detection electrodes Rx. Also, each of the channel areas may correspond to each of the nodes. In an exemplary embodiment, a channel area CH11 may correspond to a node N11.

According to a comparative embodiment, in order to measure a mutual capacitance at each of the plurality of nodes, different driving signals may be sequentially applied to the plurality of driving electrodes Tx. Also, an electrical signal may be separately measured from each of the plurality of detection electrodes Rx. For example, in order to measure the mutual capacitance C11, the driving signal may be applied to only the first driving electrode Tx1 and the electrical signal may be measured from the first detection electrode Rx1. Likewise, in order to measure the mutual capacitance Cmn, the driving signal may be applied to only the $m^{th}$ driving electrode Txm and the electrical signal may be measured from the $n^{th}$ detection electrode.

According to the comparative embodiment, in order to measure the mutual capacitance at each node, the driving signal may be applied to only one driving electrode Tx. However, in the case of a high resolution sensing circuit, distances between the plurality of driving electrodes Tx may be very short. When the distances between the plurality of driving electrodes Tx are decreased, an area of a node activated while the mutual capacitance is measured, that is, an area of the channel CH, is decreased. Also, when the area of the channel CH that is activated is decreased, an intensity of the signal obtained may be decreased. Also, the mutual capacitance measured at each node may be decreased. Thus, it may be difficult to accurately detect the amount of change in the mutual capacitance at each node. Accordingly, the sensitivity of the sensing circuit may be decreased.

In order to increase the sensing sensitivity, the driver unit DU of the sensing circuit according to an exemplary embodiment may gather the plurality of driving electrodes Tx into a plurality of driving groups and may sequentially apply an electrical signal to each of the plurality of driving groups. Also, the signal receiving unit RU of the sensing circuit may gather the plurality of detection electrodes Rx into a plurality of detection groups and may sequentially apply an electrical signal to each of the plurality of detection groups.

That is, rather than applying the electrical signal to one driving electrode Tx and detecting the electrical signal from one detection electrode Rx, the sensing circuit may apply an electrical signal to a driving group including the plurality of driving electrodes Tx and detect an electrical signal from a detection group including the plurality of detection electrodes Rx.

Applying an electrical signal to a driving group may denote simultaneously applying an electrical signal to the plurality of driving electrodes included in the driving group. Also, detecting an electrical signal from a detection group may denote detecting an electrical signal from the plurality of detection electrodes included in the detection group. That is, all of a plurality of nodes N formed by the driving group and the detection group crossing each other may be activated, so that an area of the nodes N activated while the mutual capacitance is measured, that is, an area of the channels CH, may be increased. When the area of the channels CH is increased, the signal receiving unit RU may more accurately measure the mutual capacitance, and thus, the sensitivity of the sensing circuit may be increased.

Figure 3:
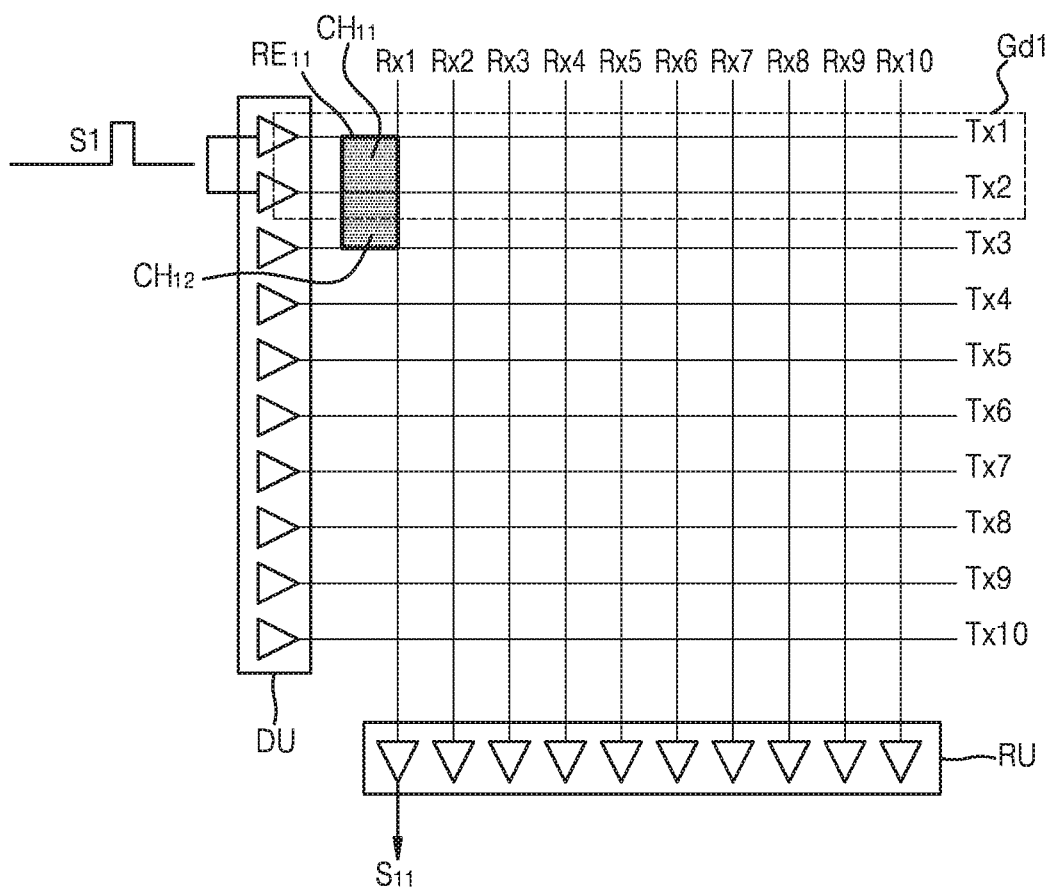
FIG. 3 is a conceptual diagram for explaining an example in which a driver unit applies a driving signal to a driving group including driving electrodes, according to an exemplary embodiment.

FIG. 3 is a conceptual diagram for explaining an example in which the driver unit DU applies a driving signal to a driving group including the plurality of driving electrodes Tx.

Referring to FIG. 3, the driver unit DU may recognize the plurality of driving electrodes Tx1 and Tx2 as one driving group and may apply a driving signal S1 to the driving group. For example, the driver unit DU may recognize the first driving electrode Tx1 and the second driving electrode Tx2 as a first driving group Gd1, and the driver unit DU may apply a same driving signal S1 to the first driving group Gd1. For example, the driver unit DU may apply a same voltage pulse to the first driving group Gd1.

The signal receiving unit RU may separately measure a signal from each of the plurality of detection electrodes Rx. When the driving group includes n (n is an arbitrary natural number) driving electrodes Tx and the signal measuring unit RU measures a signal from one detection electrode Rx, an area activated on the touch pad TP may include n×1 channel. For example, as illustrated in FIG. 3, when the first driving group Gd1 includes the first driving electrode Tx1 and the second driving electrode Tx2 and the signal measuring unit RU measures a signal S11 from a first detection electrode Rx1, an activation area RE11 may include two channels CH11 and CH22. Here, an activation area REmn denotes an area activated by an $m^{th}$ driving group Gd_m and an $n^{th}$ detection electrode Rx_n. Also, a signal Smn denotes an electrical signal measured by the signal receiving unit RU when the activation area REmn is activated. Also, a mutual capacitance GCmn denotes a mutual capacitance at the activation area REmn, which is obtained based on the electrical signal Smn.

In the example described above, a mutual capacitance GC11 at the activation area RE11 may be obtained, when the driving signal is applied to the first driving group Gd1 and the electrical signal S11 is measured from first detection electrode Rx1. The mutual capacitance GC11 at the activation area RE11 may be a combination of a mutual capacitance C11 corresponding to the channel CH11 and a mutual capacitance C12 corresponding to the channel CH12.

As illustrated in FIG. 3, when the driver unit DU applies the driving signal to the driving group Gd including the plurality of driving electrodes Tx, the number of channels included in the activation area RE may be increased, when the signal receiving unit RU measures the electrical signal. Thus, the intensity of the electrical signal measured by the signal receiving unit RU may be increased. Accordingly, the sensitivity of the sensing circuit may be increased.

When the driver unit DU applies the driving signal to the first driving group Gd1, the signal receiving unit RU may sequentially measure signals from the plurality of detection electrodes Rx.

Figure 4:
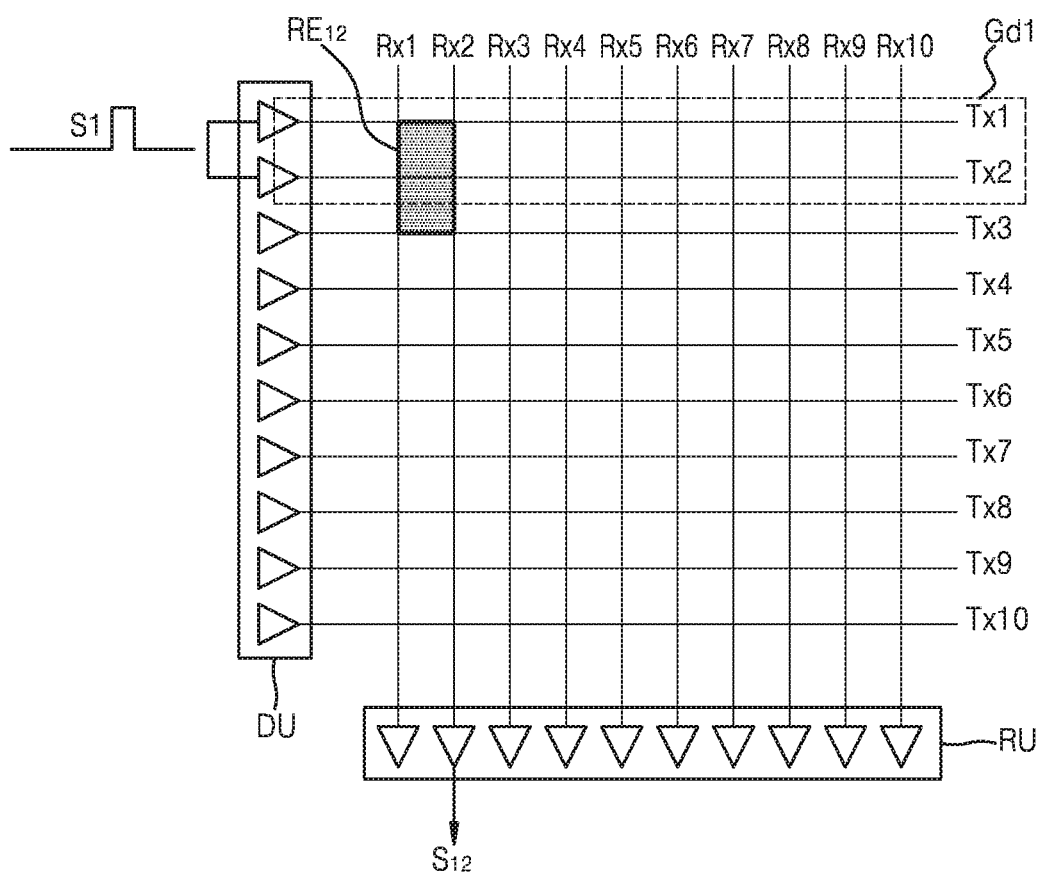
FIG. 4 is a diagram for explaining an example in which a signal receiving unit measures an electrical signal from a second detection electrode, according to an exemplary embodiment.

FIG. 4 is a diagram for explaining an example in which the signal receiving unit RU measures an electrical signal from a second detection electrode Rx2, according to an exemplary embodiment.

Referring to FIG. 4, the signal receiving unit RU illustrated in FIG. 3 may change the detection electrode Rx, from which the signal is to be measured. For example, the signal receiving unit RU may sequentially change the detection electrodes Rx, from which the electrical signals are to be measured. When the signal receiving unit RU changes the detection electrode Rx, from which the electrical signal is to be measured, an activation area RE12 may be moved. When the signal receiving unit RU changes the detection electrodes Rx, from which the electrical signals are to be measured, the activation area REmn may be moved in a horizontal direction.

Figure 5:
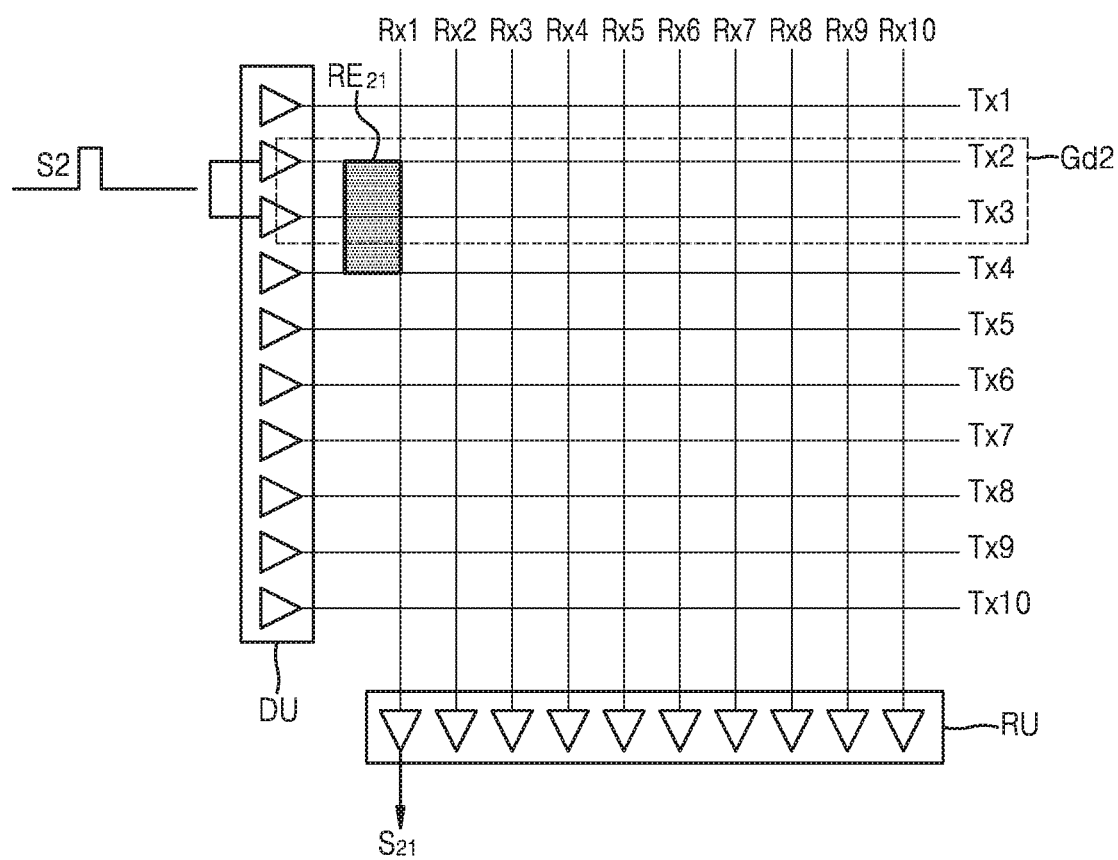
FIG. 5 is a diagram for explaining an example in which a driver unit applies a driving signal to a second driving group that is different from a first driving group, according to an exemplary embodiment.

FIG. 5 is a diagram for explaining an example in which the driver unit DU applies a driving signal to a second driving group, which is different from the first driving group, according to an exemplary embodiment.

Referring to FIG. 5, the driver unit DU may apply a driving signal S2 to a second driving group Gd2, after the driving signal S1 is applied to the first driving group Gd1. Thus, a pulse peak of the driving signal S2 applied to the second driving group Gd2 may be temporally delayed compared to a pulse peak of the driving signal S1 applied to the first driving group Gd1. An activation area $RE_{11}$ activated when the driving signal S1 is applied to the first driving group Gd11 and an activation area $RE_{21}$ activated when the driving signal S2 is applied to the second driving group Gd2 may include a same channel CH12.

As illustrated in FIG. 5, whenever the driving groups Gd are changed, the driver unit DU may sequentially change the plurality of driving electrodes Tx included in the driving groups Gd. For example, whenever the driving group Gd is moved to the next driving group Gd, the driver unit DU may allow one more of the plurality of driving electrodes Tx to be included in the next driving group Gd. That is, as illustrated in FIGS. 4 and 5, when the first driving group Gd1 includes the first and second driving electrodes Tx1 and Tx2, the second driving group Gd2 may include the second driving electrode Tx2 and a third driving electrode Tx3. That is, an $n^{th}$ driving group Gd_n may include an $n^{th}$ driving electrode Tx_n and an $n+1^{th}$ driving electrode Tx_n+1.

As described above, the plurality of driving groups Gd are divided into the first driving group Gd1, the second driving group Gd2, . . . , the $n^{th}$ driving group Gd_n. However, the order in which the driving signals are applied may not be limited thereto. For example, the driver unit DU may apply the driving signal to a third driving group Gd3 after applying the driving signal to the first driving group Gd1, and then, may apply the driving signal to the second driving group Gd2.

Also, FIGS. 3 through 5 illustrate the example in which the driving group Gd includes two driving electrodes Tx. However, embodiments are not limited thereto. For example, the driving group Gd may include k+1 (k is an arbitrary natural number) driving electrodes Tx. For example, the $n^{th}$ (n is an arbitrary natural number) driving group Gd_n may include $n^{th}$ through $n+k^{th}$ driving electrodes Tx_n, . . . , Tx_n+k.

FIGS. 3 through 5 illustrate the examples in which the signal receiving unit RU separately outputs the electrical signal from each of the plurality of detection electrodes Rx. However, embodiments are not limited thereto. For example, the signal receiving unit RU may recognize the plurality of detection electrodes Rx as a plurality of detection groups and may sequentially measure the electrical signals output from the plurality of detection groups.

Figure 6:
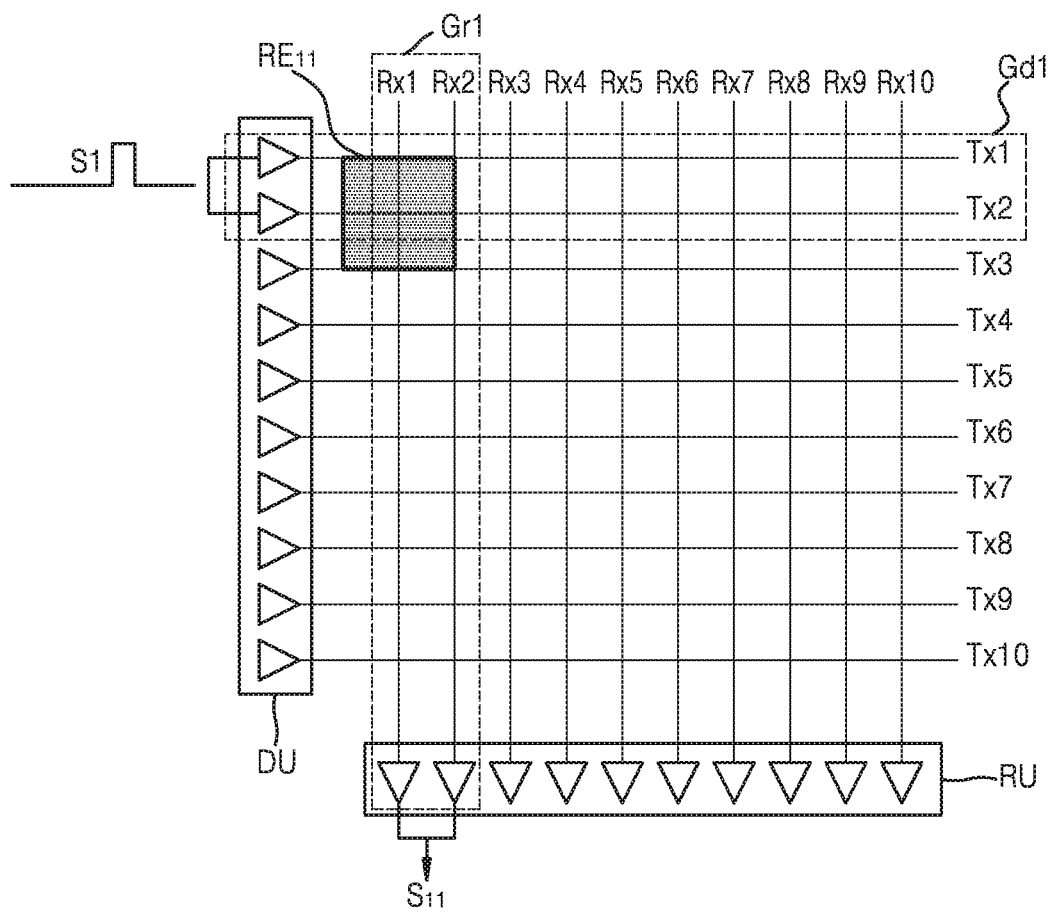
FIG. 6 is a diagram for explaining an example in which a detection group includes two detection electrodes, according to an exemplary embodiment.

FIG. 6 is a diagram for explaining an example in which a detection group Gr includes two detection electrodes, according to an exemplary embodiment.

Referring to FIG. 6, the signal receiving unit RU may recognize two detection electrodes Rx as the detection group Gr. The signal receiving unit RU may recognize the first detection electrode Rx1 and a second detection electrode Rx2 as a first detection group Gr1 and may measure an electrical signal output from the first detection group Gr1. That is, the signal receiving unit RU may output an electrical signal in which electrical signals respectively output from the first and second detection electrodes Rx1 and Rx2 are combined, wherein the first and second detection electrodes Rx1 and Rx2 are included in the first detection group Gr1.

As illustrated in FIG. 6, when the first driving group Gd1 includes the two driving electrodes Tx1 and Tx2 and the first detection group Gr1 includes the two detection electrodes Rx1 and Rx2, an activation area $RE_{11}$ activated by the first driving group Gd1 and the first detection group Gr1 may include 2×2 channels. As illustrated in FIG. 6, when the signal receiving unit RU recognizes the plurality of detection electrodes Rx as the detection group Gr and measures the electrical signal from the detection group Gr, the activation area RE activated when measuring the electrical signal may be increased. Thus, the intensity of the measured electrical signal may be increased. Accordingly, the mutual capacitance of the activation area RE may be more accurately obtained.

Figure 7:
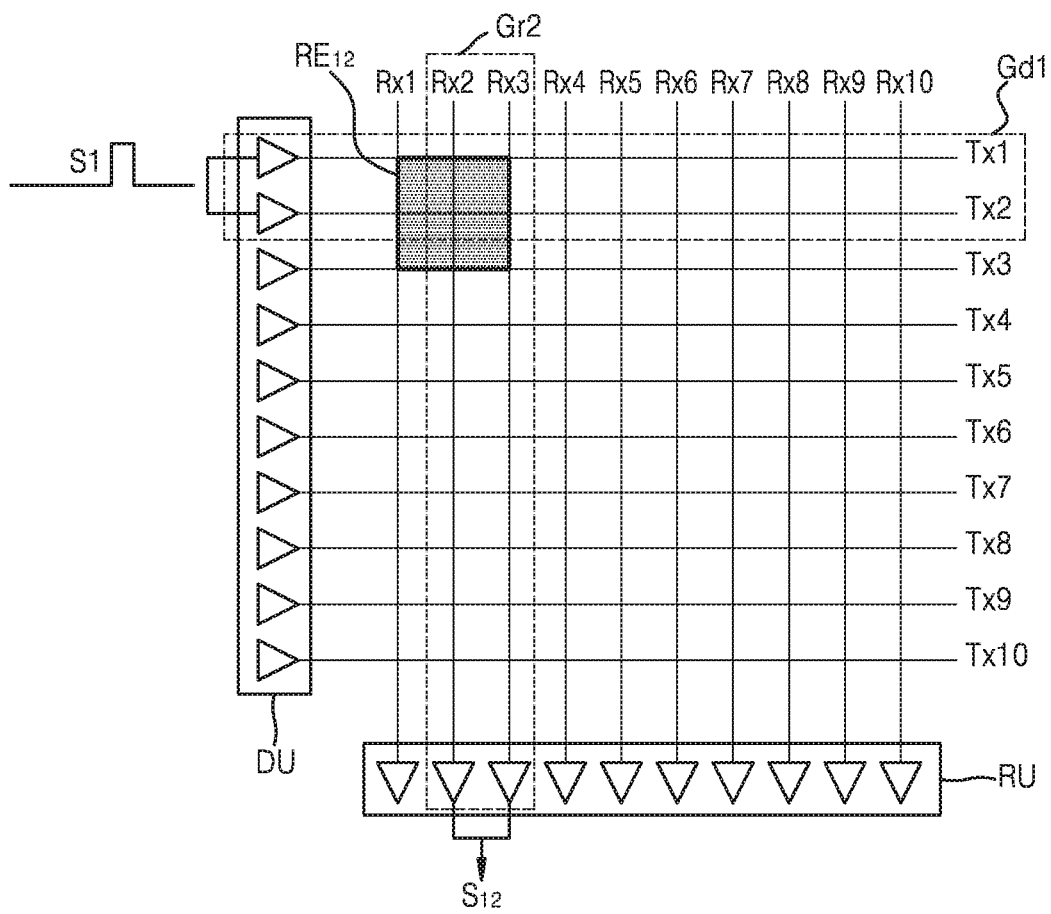
FIG. 7 is a diagram for explaining an example in which a signal receiving unit changes a detection group, from which an electrical signal is to be measured, according to an exemplary embodiment.

FIG. 7 is a diagram for describing an example in which the signal receiving unit RU changes the detection group Gr, from which an electrical signal is to be measured, according to an exemplary embodiment.

Referring to FIG. 7, the signal receiving unit RU may measure an electrical signal output from the second detection group Gr2. The second detection group Gr2 may include the second detection electrode Rx2 and a third detection electrode Rx3. The signal receiving unit RU may sequentially change the detection groups Gr, from which the electrical signals are to be measured. When the signal receiving unit RU sequentially changes the detection groups Gr, from which the electrical signals are to be measured, the activation area RE may be moved in a horizontal direction. An activation area RE12 activated by the second detection group Gr2 may include channels CH12 and CH22, which are likewise included in the activation area RE11 activated by the first detection group Gr1.

When the detection groups Gr are changed, the signal receiving unit RU may sequentially change the plurality of detection electrodes Rx included in the detection groups Gr. For example, whenever the detection group Gr is moved to the next detection group Gr, the signal receiving unit RU may allow one more of the plurality of detection electrodes Rx to be included in the next detection group Gr. That is, as illustrated in FIGS. 4 and 5, when the first detection group Gil includes the first and second detection electrodes Rx1 and Rx2, the second detection group Gr2 may include the second and third detection electrodes Rx2 and Rx3. That is, an $n^{th}$ detection group Gr_n may include an $n^{th}$ detection electrode Rx_n and an $n+1^{th}$ detection electrode Rx_n+1.

Figure 8:
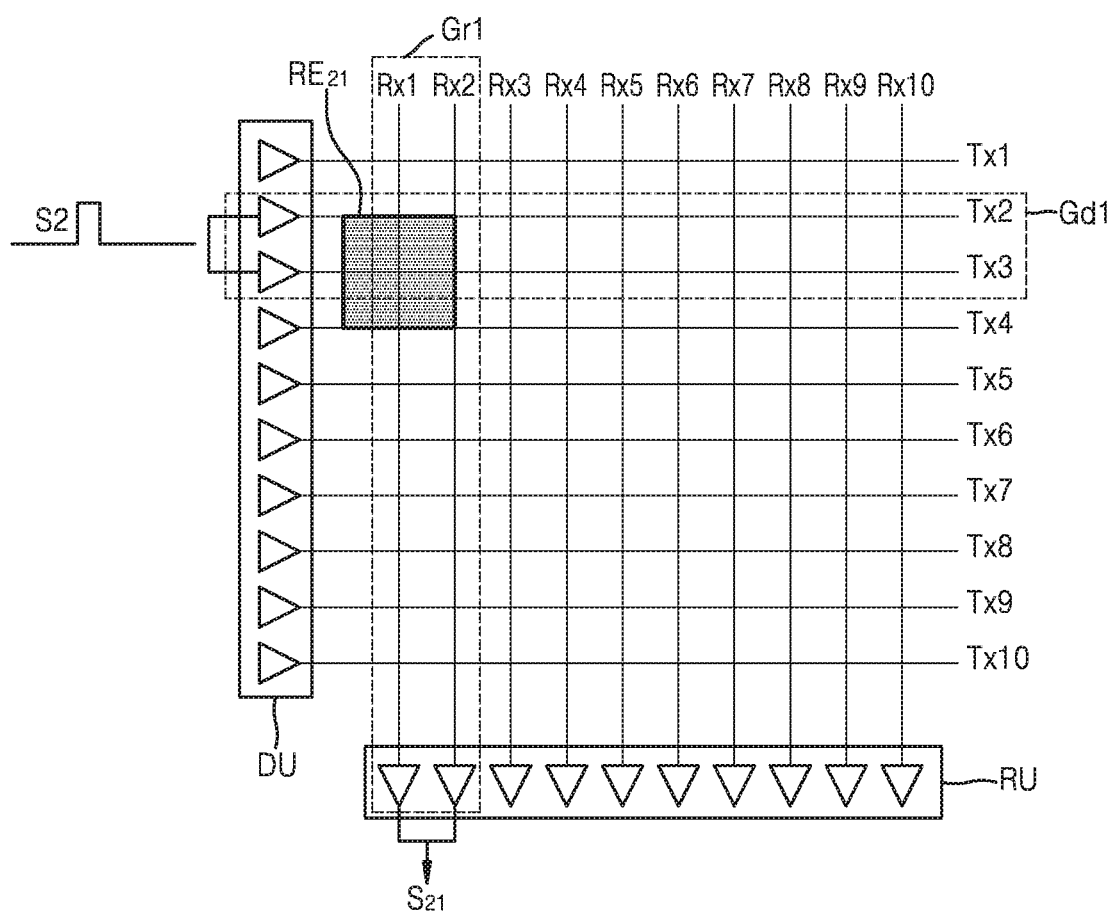
FIG. 8 is a diagram for explaining an example in which a driver unit changes a driving group, to which a driving signal is to be applied, according to an exemplary embodiment.

FIG. 8 is a diagram for explaining an example in which the driver unit DU changes the driving group Gd, to which a driving signal is to be applied, according to an exemplary embodiment.

Referring to FIG. 8, the drier unit DU may apply the driving signal S2 to the second driving group Gd2, which is different from the first driving group Gd1. The driver unit DU may apply the driving signal S2 to the second driving group Gd2 at a time later than a time at which the driver unit DU applies the driving signal S1 to the first driving group Gd1. Thus, a pulse peak of the driving signal S2 applied to the second driving group Gd2 may be temporally delayed compared to a pulse peak of the driving signal S1 applied to the first driving group Gd1. The activation area $RE_2$, activated by the second driving group Gd2 may include the same channels CH21 and CH 22 as the activation area $RE_{11}$ activated by the first driving group Gd1. When the driver unit DU changes the driving groups Gr, to which the driving signals are to be applied, the activation area RE may be moved in a vertical direction.

As described above, the plurality of detection groups Gr are divided into the first detection group Gr1, the second detection group Gr2, . . . , the $n^{th}$ detection group Gr_n. However, the order in which the signal receiving unit RU measures the signals are not limited thereto. For example, the signal receiving unit RU may measure the electrical signal output from a third detection group Gr3 after measuring the electrical signal output from the first detection group Gr1, and then, may measure the electrical signal output from the second detection group Gr2.

Also, FIGS. 6 through 8 illustrate the example in which the detection group Gr includes two detection electrodes Tx. However, embodiments are not limited thereto. For example, the detection group Gr may include k+1 (k is an arbitrary natural number) detection electrodes Tx. For example, the $n^{th}$ (n is an arbitrary natural number) detection group Gr_n may include $n^{th}$ through $n+k^{th}$ detection electrodes Rx_n, . . . , Rx_n+k.

Figure 9:
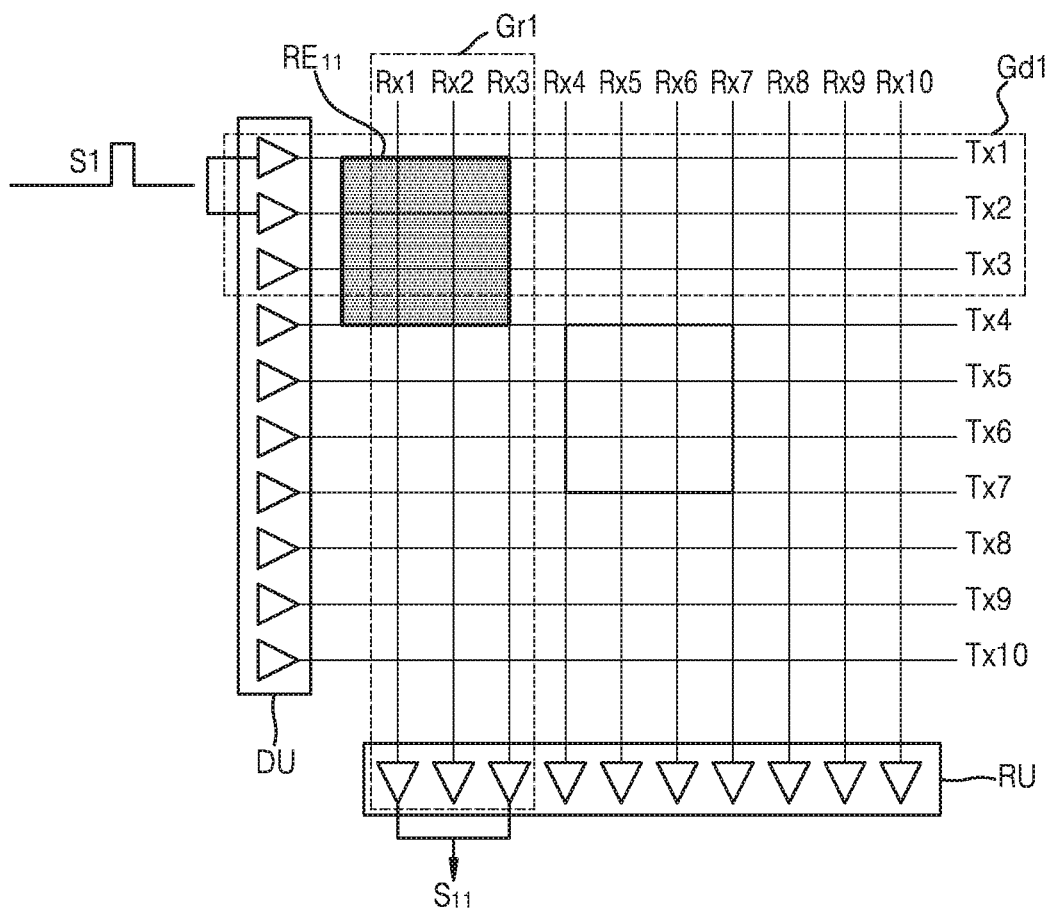
FIG. 9 is a diagram of an example in which an activation area includes 3×3 channels, according to an exemplary embodiment.

FIG. 9 is a diagram of an example in which an activation area includes 3×3 channels, according to an exemplary embodiment.

Referring to FIG. 9, the driving group Gd may include three driving electrodes Tx and the detection group Gr may include three detection electrodes Rx. For example, the first driving group Gd1 may include the first through third driving electrodes Tx1, Tx2, and Tx3 and the first detection group Gr1 may include the first through third detection electrodes Rx1, Rx2, and Rx3. Also, the activation area $RE_{11}$ activated by the first driving group Gd1 and the first detection group Gil may include 3×3 channels.

Figure 10A:
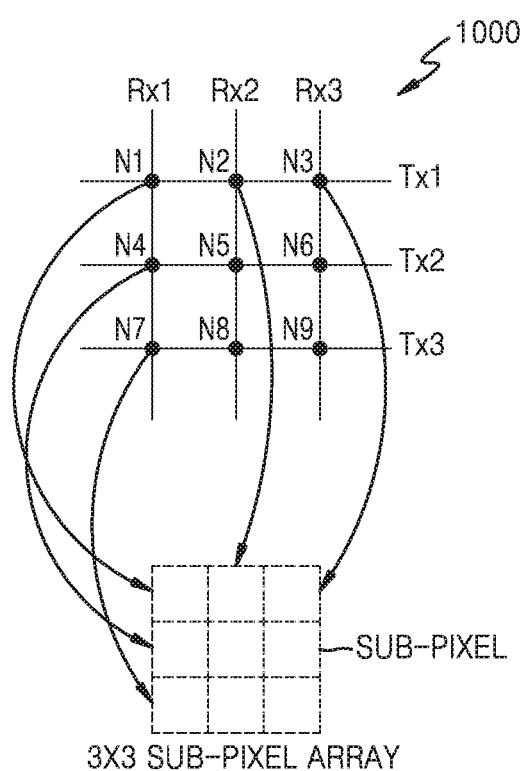
FIGS. 10A and 10B are diagrams for explaining a process in which a sub-pixel array and a super-pixel array are generated by using a sensing circuit, according to an exemplary embodiment.
Figure 10B:
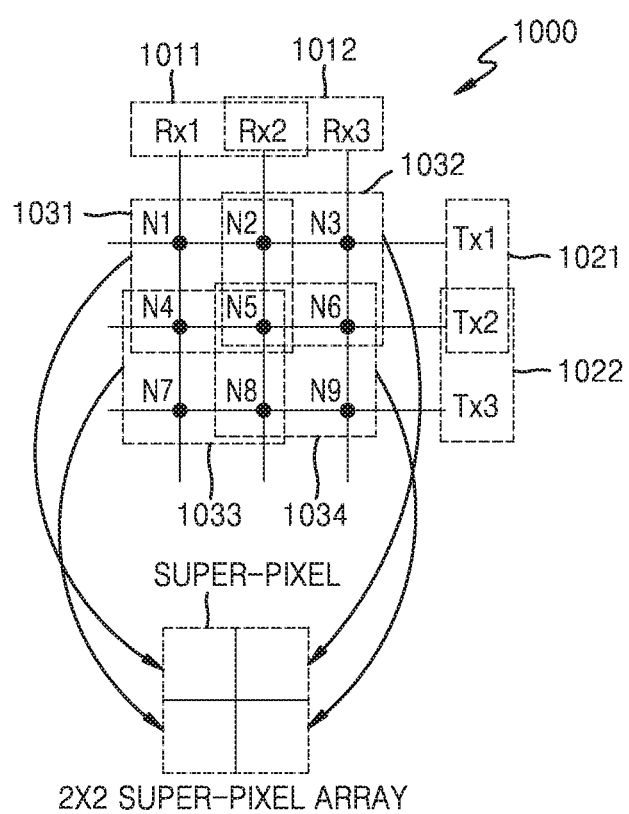

FIGS. 10A and 10B are diagrams for explaining a process of generating a sub-pixel array and a super-pixel array by using a sensing circuit 1000, according to an exemplary embodiment.

Referring to FIG. 10A, the sensing circuit 1000 may include the plurality of driving electrodes Tx1 through Tx3 and the plurality of detection electrodes Rx1 through Rx3. A plurality of nodes N1 through N4 formed by each of the plurality of driving electrodes Tx1 through Tx3 and each of the plurality of detection electrodes Rx1 through Rx3 crossing each other indicate mutual capacitances between the driving electrodes Tx1 through Tx3 and the detection electrodes Rx1 through Rx3. For example, the node N1 formed where the first detection electrode Rx1 and the first driving electrode Tx1 cross each other indicates the mutual capacitance between the first detection electrode Rx1 and the first driving electrode Tx1.

According to an exemplary embodiment, while the node N1 is activated by applying an electrical signal to the first driving electrode Tx1 and activating the first detection electrode Rx1, the signal receiving unit RU of the sensing circuit 1000 may measure the mutual capacitance corresponding to the node N1, that is, the mutual capacitance between the first driving electrode Tx1 and the first detection electrode Rx1.

An image data processing apparatus may receive, from the signal receiving unit RU, a plurality of mutual capacitances corresponding to a plurality of nodes N1 through N9 that are activated, respectively, and may convert the plurality of mutual capacitances into a plurality of sub-pixels, respectively. Also, the image data processing apparatus may generate image data of the sub-pixel array including the plurality of sub-pixels. Referring to FIG. 10A, nine (9) sub-pixels included in the sub-pixel array having a 3×3 size may correspond to the nine (9) nodes N1 through N9 of the sensing circuit 1000.

In the case of the sensing circuit 1000 of FIG. 10A, which has high resolution, distances between the plurality of driving electrodes Tx1 through Tx3 and distances between the plurality of detection electrodes Rx1 through Rx3 may be very short. In this case, the sensitivity may be degraded, when a sensor is located below a thin protection layer, such as strengthened glass of a cellular phone, etc.

Referring to FIG. 10B, in order to increase the sensing sensitivity, the sensing circuit 1000 may recognize the plurality of driving electrodes Tx1 through Tx3 as a plurality of driving groups and sequentially apply electrical signals to the plurality of driving groups, and may recognize the plurality of detection electrodes Rx1 through Rx3 as a plurality of detection groups and sequentially activate the plurality of detection groups.

According to an exemplary embodiment, the sensing circuit 1000 may group the first and second detection electrodes Rx1 and Rx2 into a first detection group 1011 and may group the second and third detection electrodes Rx2 and Rx3 into a second detection group 1012. Likewise, the sensing circuit 1000 may group the first and second driving electrodes Tx1 and Tx2 into a first driving group 1021 and may group the second and third driving electrodes Tx2 and TX3 into a second driving group 1022.

When an electrical signal is applied to the first driving group 1021 and the first detection group 1011 is activated, all of a plurality of nodes N1, N2, N4, and N5 included in a first separate activation area 1031 are activated, and thus, the signal receiving unit RU may measure a mutual capacitance with respect to all of the plurality of nodes N1, N2, N4, and N5. That is, the mutual capacitance measured by the signal receiving unit RU may be a sum of a plurality of mutual capacitances corresponding to the plurality of nodes N1, N2, N4, and N5, respectively. The image data processing apparatus may receive, from the signal receiving unit RU of the sensing circuit 1000, the mutual capacitance with respect to all of the plurality of nodes N1, N2, N4, and N5 that are activated, and may convert the received mutual capacitance into a super-pixel.

By using this method, the image data processing apparatus may receive a mutual capacitance with respect to all of a plurality of nodes included in each of second through fourth separate activation areas 1032 through 1034 and convert the received mutual capacitances into super-pixels. Also, the image data processing apparatus may generate image data of a super-pixel array including the plurality of super-pixels.

Unlike the method of FIG. 10A, whereby an electrical signal is applied to one driving electrode and one detection electrode is activated, in the method of FIG. 10B, an electrical signal may be applied to the driving group including the plurality of driving electrodes and the detection group including the plurality of detection electrodes may be activated. That is, by applying the electrical signal to the driving group and detecting an electrical signal from the detection group, an effect of increasing the intensity of an electrical signal applied to a separate electrode of the sensing circuit 1000 may be obtained. Accordingly, the sensitivity of the sensing circuit 1000 may be increased.

Meanwhile, the image data processing apparatus of FIG. 10A may generate the image data of the sub-pixel array including the plurality of sub-pixels and having the 3×3 size, by converting the mutual capacitances corresponding to the nine (9) nodes N1 through N9, respectively, into the sub-pixels. On the contrary, the image data processing apparatus of FIG. 10B may generate the image data of the super-pixel array including the plurality of super-pixels and having a 2×2 size, by converting the mutual capacitances with respect to all of the plurality of nodes included in each of the four (4) separate activation areas 1031 through 1034, into the super-pixels.

That is, in comparison with the resolution of the image data of the sub-pixel array of FIG. 10A, the resolution of the image data of the super-pixel array having the 2×2 size of FIG. 10B may be less. Hereinafter, in order to increase the resolution of the image data of the super-pixel array, a method of converting the image data of the super-pixel array into the image data of the sub-pixel array will be described in detail.

Figure 11:
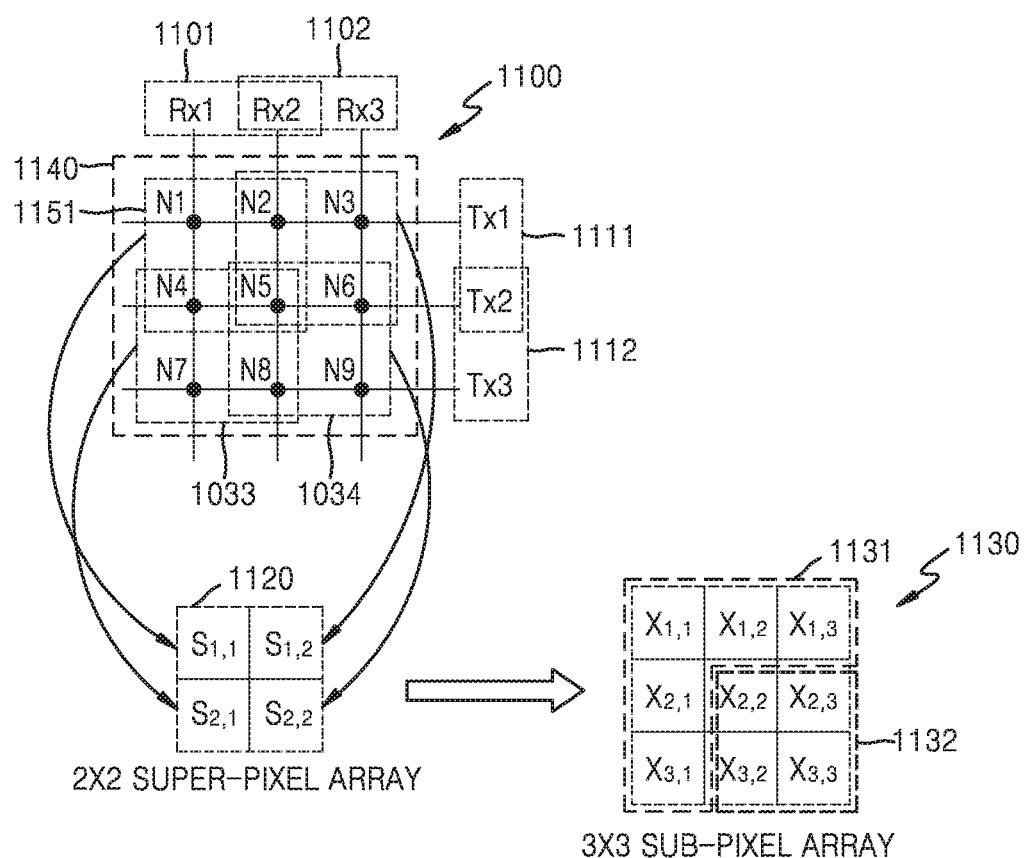
FIG. 11 is a diagram for explaining a schematic method of converting a super-pixel array into a sub-pixel array, according to an exemplary embodiment.

FIG. 11 is a diagram for schematically explaining a method of converting the super-pixel array into the sub-pixel array.

As shown in FIG. 11, the sensing circuit 1100 includes the plurality of driving electrodes Tx1 through Tx3 and the plurality of detection electrodes Rx1 through Rx3. The nine (9) nodes N1 through N9 may be formed at intersections between of the plurality of driving electrodes Tx1 through Tx3 and the plurality of detection electrodes Rx1 through Rx3. In order to increase the sensing sensitivity, the sensing circuit 1100 may control the plurality of driving electrodes Tx1 through Tx3 as the plurality of driving groups and sequentially apply electrical signals to the plurality of driving groups, and may control the plurality of detection electrodes Rx1 through Rx3 as the plurality of detection groups and sequentially detect electrical signals from the plurality of detection groups.

The sensing circuit 1100 may group the first and second driving electrodes Tx1 and Tx2 into a first driving group 1111 and group the second and third driving electrodes Tx2 and Tx3 into a second driving group 1112. In the same manner, the sensing circuit 1100 may group the first and second detection electrodes Rx1 and Rx2 into a first detection group 1101 and group the second and third detection electrodes Rx2 and Rx3 into a second detection group 1102.

Meanwhile, FIG. 11 illustrates that two driving electrodes Tx adjacent to each other from among the three (3) driving electrodes Tx1 through Tx3 are grouped and two detection electrodes Rx adjacent to each other from among the three (3) detection electrodes Rx1 through Rx3 are grouped. However, the number of the driving electrodes Tx or the detection electrodes Rx or the method of grouping the driving electrodes Tx or the detection electrodes Rx, the driving electrodes Tx and the detection electrodes Rx being included in the sensing circuit 1100, is not limited thereto.

According to an exemplary embodiment, when an electrical signal is applied to the first driving group 1111 to activate the first detection group 1101, all of a plurality of nodes N1, N2, N4, and N5 included in a separate activation area 1151 are activated, and thus, the signal receiving unit RU may measure a mutual capacitance at the plurality of activated nodes N1, N2, N4, and N5. That is, the mutual capacitance measured by the signal receiving unit RU may be a sum of mutual capacitances at the plurality of nodes N1, N2, N4, and N5, respectively. The image data processing apparatus may receive, from the signal receiving unit RU of the sensing circuit 1100, the mutual capacitance with respect to all of the plurality of nodes N1, N2, N4, and N5 that are activated, and may convert the received mutual capacitance into a super-pixel $S_{1,1}$.

The image data processing apparatus may obtain a plurality of super-pixels $S_{1,1}$, $S_{1,2}$, $S_{2,1}$, and $S_{2,2}$ by using this method, and may generate image data of a super-pixel array 1120 having a 2×2 size and including the plurality of super-pixels $S_{1,1}$, $S_{1,2}$, $S_{2,1}$, and $S_{2,2}$.

Meanwhile, the size of the super-pixel array 1120 may be determined based on a size of the separate activation area and the number of nodes included in the sensing circuit 1100. Here, the size of the separate activation area may be determined based on the number of driving electrodes and the detection electrodes included in the driving group and the detection group, respectively. Also, the number of nodes may be determined based on the number of driving electrodes and the number of detection electrodes included in the sensing circuit 1100 since the nodes are formed by the driving electrodes and the detection electrodes crossing each other.

According to an exemplary embodiment, when the size of the separate activation area is p×q and the number of nodes are (M+p−1)×(N+q−1), the size of the super-pixel array 1120 may be M×N. M and p may denote a natural number that is greater than or equal to 2, and M may be greater than p. N and q may denote a natural number that is greater than equal to 2, and N may be greater than q. Referring to FIG. 11, since the size of the separate activation area is 2×2 and the number of nodes included in the sensing circuit 1100 is 9 (i.e., 3×3), the size of the super-pixel array 1120 becomes 2×2.

The image data processing apparatus may convert the super-pixel array 1120 having the 2×2 size into a sub-pixel array 1130 having a 3×3 size. In order to convert the super-pixel array 1120 into the sub-pixel array 1130, since the sub-pixel array 1130 includes the total nine (9) sub-pixels, at least five (5) values related to the sub-pixel array 1130 has to be additionally obtained, in addition to the pre-obtained four (4) super-pixels $S_{1,1}$, $S_{1,2}$, $S_{2,1}$, and $S_{2,2}$.

In order to additionally obtain the values required to convert the super-pixel array 1120 into the sub-pixel array 1130, the sensing circuit 1100 may apply an electrical signal to the separate driving electrode Tx and activate the separate detection electrode Rx to separately activate one or more nodes in an integrated activation area 1140. Meanwhile, the integrated activation area 1140 may be an area including all of the nodes N1 through N9 on the sensing circuit 1100, used to generate the super-pixel array 1120.

According to an exemplary embodiment, the image data processing apparatus may obtain values of 5 first sub-pixels $x_{1,1}$, $x_{1,2}$, $x_{1,3}$, $x_{2,1}$, and $x_{3,1}$ included in a first area 1131 of the sub-pixel array 1130. FIG. 11 illustrates that the first area 1131 includes the five (5) sub-pixels located at an upper end and a left side of the sub-pixel array 1130, but the location of the first area 1131 in the sub-pixel array 1130 is not limited thereto. For example, the first area 1131 may include 5 sub-pixels located at a rear end and a right side of the sub-pixel array 1130 or may include 8 sub-pixels located at an edge of the sub-pixel array 1130.

The image data processing apparatus may calculate values of four (4) second sub-pixels $x_{2,2}$, $x_{2,3}$, $x_{3,2}$, and $x_{3,3}$ included in a second area 1132 of the sub-pixel array 1130, by using the 4 super-pixels $S_{1,1}$, $S_{1,2}$, $S_{2,1}$, and $S_{2,2}$ and the values of the 5 first sub-pixels $x_{1,1}$, $x_{1,2}$, $x_{1,3}$, $x_{2,1}$, and $x_{3,1}$. The image data processing apparatus may convert the super-pixel array 1120 having the 2×2 size into the sub-pixel array 1130 having the 3×3 size by using the values of the 5 first sub-pixels $x_{1,2}$, $x_{1,3}$, $x_{2,1}$, and $x_{3,1}$ and the values of the 4 second sub-pixels $x_{2,2}$, $x_{2,3}$, $x_{3,2}$, and $x_{3,3}$.

Figure 12:
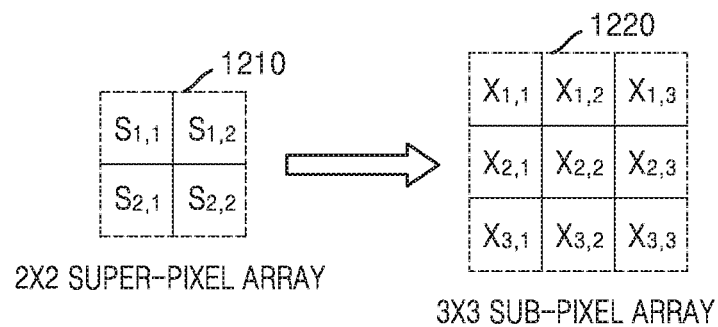
FIG. 12 is a diagram for explaining a relationship between super-pixels and sub-pixels, according to an exemplary embodiment.
Figure 12:
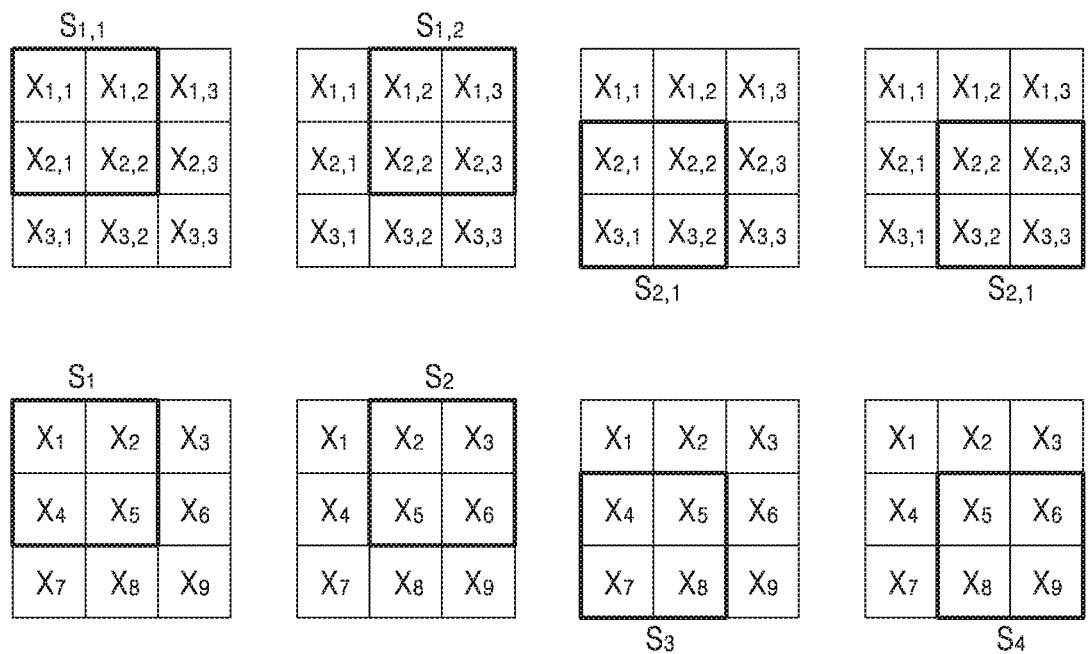

FIG. 12 is a diagram for explaining a relationship between super-pixels and sub-pixels, according to an exemplary embodiment.

An image data processing apparatus may convert a super-pixel array into a sub-pixel array. As described above in detail with reference to FIG. 11, the image data processing apparatus may convert a super-pixel array 1210 having a 2×2 size into a sub-pixel array 1220 having a 3×3 size. Referring to FIG. 12, the relationship between the super-pixels included in the super-pixel array 1210 and the sub-pixels included in the sub-pixel array 1220 may be expressed according to Equation 1 below.

$S_{1,1}=x_{1,1}+x_{1,2}+x_{2,1}+x_{2,2}=\Sigma_{i=1}^{2}\Sigma_{j=1}^{2}x_{i,j}$ $S_{1,2}=x_{1,2}+x_{1,3}+x_{2,2}+x_{2,3}=\Sigma_{i=1}^{2}\Sigma_{j=2}^{3}x_{i,j}$ $S_{2,1}=x_{2,1}+x_{2,2}+x_{3,1}+x_{3,2}=\Sigma_{i=2}^{3}\Sigma_{j=1}^{2}x_{i,j}$ $S_{2,2}=x_{2,2}+x_{2,3}+x_{3,2}+x_{3,3}=\Sigma_{i=2}^{3}\Sigma_{j=2}^{3}x_{i,j}$ [Equation 1]

When a size of a separate activation area is p×q and a size of the super-pixel array 1210 is M×N, the relationship between the super-pixels and the sub-pixels of Equation 1 is generally represented by $S_{m,n}=\Sigma_{i=m}^{m+p-1}\Sigma_{j=n}^{n+q-1}x_{i,j}$ (Here, m=1, 2, . . . , M, n=1, 2, . . . , N). The relationship between the super-pixels and the sub-pixels, which is represented by Equation 1, may be represented via a matrix equation according to Equation 2.

$$\begin{bmatrix} S_{1,1} \\ S_{1,2} \\ S_{2,1} \\ S_{2,2} \end{bmatrix} = \begin{bmatrix} 1 & 1 & 0 & 1 & 1 & 0 & 0 & 0 & 0 \\ 0 & 1 & 1 & 0 & 1 & 1 & 0 & 0 & 0 \\ 0 & 0 & 0 & 1 & 1 & 0 & 1 & 1 & 0 \\ 0 & 0 & 0 & 0 & 1 & 1 & 0 & 1 & 1 \end{bmatrix} \begin{bmatrix} x_{1,1} \\ x_{1,2} \\ x_{1,3} \\ x_{2,1} \\ x_{2,2} \\ x_{2,3} \\ x_{3,1} \\ x_{3,2} \\ x_{3,3} \end{bmatrix}$$ [Equation 2]

The relationship between the super-pixels and the sub-pixels may be represented as a vector. In this case, the relationship between the super-pixels included in the super-pixel array 1210 and the sub-pixels included in the sub-pixel array 1220 may be expressed according to Equation 3 below.

$\overline{S}_{1}=\overline{x}_{1}+\overline{x}_{2}+\overline{x}_{4}+\overline{x}_{5}=\Sigma_{i=1}^{2}\Sigma_{j=1}^{2}\overline{x}_{3(i-1)+j}$ $\overline{S}_{2}=\overline{x}_{2}+\overline{x}_{3}+\overline{x}_{5}+\overline{x}_{6}=\Sigma_{i=1}^{2}\Sigma_{j=2}^{3}\overline{x}_{3(i-1)+j}$ $\overline{S}_{3}=\overline{x}_{4}+\overline{x}_{5}+\overline{x}_{7}+\overline{x}_{8}=\Sigma_{i=2}^{3}\Sigma_{j=1}^{2}\overline{x}_{3(i-1)+j}$ $\overline{S}_{4}=\overline{x}_{5}+\overline{x}_{6}+\overline{x}_{8}+\overline{x}_{9}=\Sigma_{i=2}^{3}\Sigma_{j=2}^{3}\overline{x}_{3(i-1)+j}$ [Equation 3]

The image data processing apparatus may convert mutual capacitances corresponding to a plurality of nodes included in the separate activation area on the sensing circuit into the super-pixels. When the size of the separate activation area is p×q and the size of the super-pixel array 1210 is M×N, the vectorial relationship between the super-pixels and the sub-pixels, represented by Equation 3, may be generally represented by $\overline{S}_{N(m-1)+n}=\Sigma_{i=m}^{m+p-1}\Sigma_{j=n}^{n+q-1}\overline{x}_{(N+q-1)(i-1)+j}$ (Here, m=1, 2, . . . , M, n=1, 2, . . . , N).

The relationship between the super-pixel array 1210 and the sub-pixel array 1220, represented by Equation 3, may be represented via a matrix equation according to Equation 4.

$$\begin{bmatrix} \overline{S}_{1} \\ \overline{S}_{2} \\ \overline{S}_{3} \\ \overline{S}_{4} \end{bmatrix} = \begin{bmatrix} 1 & 1 & 0 & 1 & 1 & 0 & 0 & 0 & 0 \\ 0 & 1 & 1 & 0 & 1 & 1 & 0 & 0 & 0 \\ 0 & 0 & 0 & 1 & 1 & 0 & 1 & 1 & 0 \\ 0 & 0 & 0 & 0 & 1 & 1 & 0 & 1 & 1 \end{bmatrix} \begin{bmatrix} \overline{x}_{1} \\ \overline{x}_{2} \\ \overline{x}_{3} \\ \overline{x}_{4} \\ \overline{x}_{5} \\ \overline{x}_{6} \\ \overline{x}_{7} \\ \overline{x}_{8} \\ \overline{x}_{9} \end{bmatrix}$$ [Equation 4]

When the size of the separate activation area is p×q and the size of the super-pixel array 1210 is M×N, the matrix relationship between the super-pixels and the sub-pixels, represented by Equation 4, may be generally represented by $\{\bar{s}_i\}=[R_{i,j}]\{\bar{x}_j\}$, (Here, i=1, 2, . . . , MN, j=1, 2, . . . , (M+p−1)(N+q−1)). Here, $\{\bar{s}_i\}$ is a super-pixel vector having a MN×1 size and $\{\bar{x}_j\}$ is a sub-pixel vector having a (M+p−1)(N+q−1)×1 size.

Also, $[R_{i,j}]$ is a relationship matrix representing a relationship between the super-pixels and the sub-pixels and having a MN×(M+p−1)(N+q−1) size. That is, the size of $[R_{i,j}]$ may be determined based on the sizes of the super-pixel vector $\{\bar{s}_i\}$ and the sub-pixel vector $\{\bar{x}_j\}$.

When the separate activation area is moved by a certain pitch in the integrated activation area, the plurality of nodes in the separate activation area may be identified to calculate matrix elements of $[R_{i,j}]$. Here, the term "pitch" is a unit of a movement distance indicating the number of nodes through which the separate activation area shifts when the separate activation area is moved on the sensing circuit.

Referring to FIG. 11, when a separate activation area 1151 having a 2×2 size is moved by 1 pitch in an integrated activation area 1140 having a 3×3 size, the plurality of nodes (for example, (N1, N2, N4, N5), (N2, N3, N5, N6), (N4, N5, N7, N8), and (N5, N6, N8, N9)) in the separate activation area 1151 may be determined. An image data processing apparatus may determine a matrix element of $[R_{i,j}]$ that corresponds to the plurality of nodes in the separate activation area 1151 as a first value and the remaining matrix elements of $[R_{i,j}]$, except the matrix element of $[R_{i,j}]$ that is determined as the first value, as a second value, so as to ultimately calculate the matrix element of $[R_{i,j}]$. In Equation 4, the first value is set as "1" and the second value is set as "0," but the first and second values are not limited thereto. The process of determining the matrix element of $[R_{i,j}]$ may be expressed according to Equation 5 below.

$$R_{i,j} = 1 \qquad \text{[Equation 5]}$$
$$\text{if } i = (N+q-1)(m-1)+n; \text{ and}$$
$$(N+p-1)(m-1)+n \leq$$
$$\qquad j \leq (N+p-1)(m-1)+n+q-1$$
$$\begin{pmatrix} m = 1, 2, \cdots, M; \\ n = 1, 2, \cdots, N \end{pmatrix}$$

Hereinafter, the method of converting the super-pixel array into the sub-pixel array will be described, based on the vectorial relationship between the super-pixels and the sub-pixels, for convenience of explanation.

Figure 13:
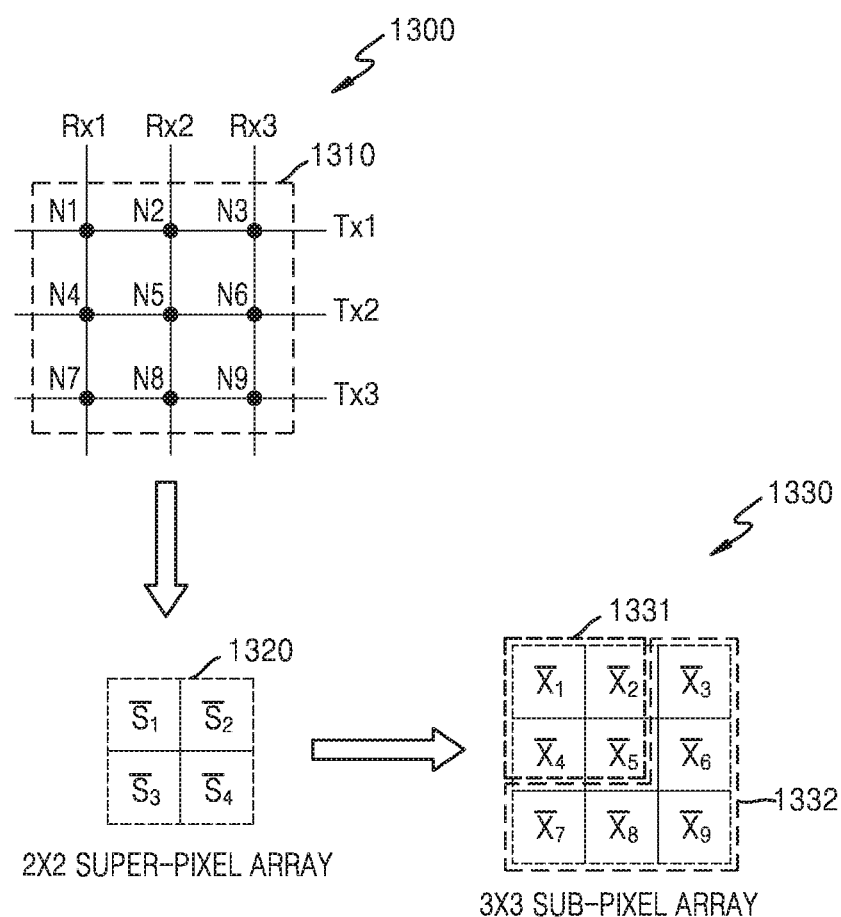
FIG. 13 is a diagram for explaining a method of converting a super-pixel array into a sub-pixel array, according to an exemplary embodiment.

FIG. 13 is a diagram for explaining the method of converting the super-pixel array into the sub-pixel array, according to an exemplary embodiment.

In order to increase the sensing sensitivity of a sensing circuit, an image data processing apparatus may gather a plurality of driving electrodes into a plurality of driving groups and sequentially apply electrical signals to the plurality of driving groups, and may gather a plurality of detection electrodes into a plurality of detection groups and sequentially detect electrical signals from the plurality of detection groups.

When an electrical signal is applied to a particular driving group and a particular detection group is selected, a plurality of nodes included in an separate activation area may be activated and the image data processing apparatus may receive signals corresponding to mutual capacitances with respect to all of the plurality of nodes that are activated and convert the received mutual capacitances into super-pixels.

That is, referring to Equation 3 above, $\bar{S}_1, \bar{S}_2, \bar{S}_3$ and $\bar{S}_4$ indicating the super-pixels are determined values. However, since the values of the total nine (9) sub-pixels $\bar{x}_1$ through $\bar{x}_9$ in Equation 3 are not identified, it is needed to obtain at least five (5) values related to the sub-pixel array, in order to convert the super-pixel array into the sub-pixel array.

Referring to FIG. 13, in order to obtain the values additionally needed to convert a super-pixel array 1320 into a sub-pixel array 1330, a sensing circuit 1300 may apply an electrical signal to a separate driving electrode Tx and select a separate detection electrode Rx, to separately activate one or more nodes in an integrated activation area 1310. Here, the integrated activation area 1310 may include all of nodes N1 through N9 on the sensing circuit 1300, which are used to generate the super-pixel array 1320.

The image data processing apparatus may receive mutual capacitances corresponding to the one or more nodes separately activated and convert the received mutual capacitances into sub-pixels, thereby obtaining values of the sub-pixels included in the sub-pixel array 1330.

According to an exemplary embodiment, the image data processing apparatus may obtain values of five (5) first sub-pixels $\bar{x}_1$ through $\bar{x}_4$, and $\bar{x}_7$ included in a first area 1331 of the sub-pixel array 1330. In this case, the image data processing apparatus may calculate values of four (4) second sub-pixels $\bar{x}_5, \bar{x}_6, \bar{x}_8$, and $\bar{x}_9$ included in a second area 1332 of the sub-pixel array 1330, by using the 4 super-pixels $\bar{S}_1$ through $\bar{S}_4$ and the values of the 5 first-sub pixels $\bar{x}_1$ through $\bar{x}_4$, and $\bar{x}_7$.

That is, since the values of the 5 first sub-pixels $\bar{x}_1$ through $\bar{x}_4$, and $\bar{x}_7$ from among the nine (9) sub-pixels $\bar{x}_1$ through $\bar{x}_9$ of Equation 3 are obtained by using the process described above, the values of the 4 second sub-pixels $\bar{x}_5, \bar{x}_6, \bar{x}_8$, and $\bar{x}_9$ included in the second area 1332 of the sub-pixel array 1330 may be calculated by Equation 6 below.

$$\bar{S}_1 - (\bar{x}_1 + \bar{x}_2 + \bar{x}_4) = \bar{x}_5$$
$$\bar{S}_2 - (\bar{x}_2 + \bar{x}_3) = \bar{x}_5 + \bar{x}_6$$
$$\bar{S}_3 - (\bar{x}_3 + \bar{x}_7) = \bar{x}_5 + \bar{x}_8$$
$$\bar{S}_4 = \bar{x}_5 + \bar{x}_6 + \bar{x}_8 + \bar{x}_9 \qquad \text{[Equation 6]}$$

Referring to Equation 6, the pre-obtained 4 super-pixels $\bar{S}_1$ through $\bar{S}_4$ and the values of the 5 first sub-pixels $\bar{x}_1$ through $\bar{x}_4$, and $\bar{x}_7$ may be shifted to the left side and the four equations may be solved to calculate the values of the 4 second sub-pixels $\bar{x}_5, \bar{x}_6, \bar{x}_8$, and $\bar{x}_9$.

The 4 equations of Equation 6 may be represented via a matrix equation according to Equation 7.

$$\begin{bmatrix} \bar{S}_1 \\ \bar{S}_2 \\ \bar{S}_3 \\ \bar{S}_4 \end{bmatrix} - \begin{bmatrix} [R_{i,j_a}] & [R_{i,j_b}] \\ \begin{matrix} 1 & 1 & 0 \\ 0 & 1 & 1 \\ 0 & 0 & 0 \\ 0 & 0 & 0 \end{matrix} & \begin{matrix} 1 & 0 \\ 0 & 0 \\ 1 & 1 \\ 0 & 0 \end{matrix} \end{bmatrix} \begin{bmatrix} \bar{x}_1 \\ \bar{x}_2 \\ \bar{x}_3 \\ \bar{x}_4 \\ \bar{x}_7 \end{bmatrix} = \begin{bmatrix} 1 & 0 & 0 & 0 \\ 1 & 1 & 0 & 0 \\ 1 & 0 & 1 & 0 \\ 1 & 1 & 1 & 1 \end{bmatrix} \begin{bmatrix} \bar{x}_5 \\ \bar{x}_6 \\ \bar{x}_8 \\ \bar{x}_9 \end{bmatrix} \qquad \text{[Equation 7]}$$

The formulas included in Equation 7 will be described in more detail based on Equations 8 through 12.

$$[\hat{s}_i] = [R_{i,j_c}]\{\bar{x}_{j_c}\} \qquad \text{[Equation 8]}$$

Referring to Equation 8, when a size of the super-pixel array is M×N, $\{\hat{s}_i\}$ is a super-pixel vector having a MN×1 size, and $\{\bar{x}_{j_c}\}$ is a sub-pixel vector having a MN×1 size, a value of which is to be obtained. Also, $[R_{i,j_c}]$ is a relationship matrix having a MN×MN size and representing a relationship between $\{\hat{s}_i\}$ and $\{\bar{x}_{j_c}\}$.

Referring to Equation 6 and Equation 8, $\{\hat{s}_i\}$ is a super-pixel vector having a 4×1 size, obtained by subtracting a relationship vector related to the 5 first sub-pixels $\bar{x}_1$ through $\bar{x}_4$ and $\bar{x}_7$ from the 4 super-pixels $\bar{S}_1$ through $\bar{S}_4$. $\{\bar{x}_{j_c}\}$ is a sub-pixel vector having a 4×1 size indicating the 4 second sub-pixels $\bar{x}_5$, $\bar{x}_6$, $\bar{x}_8$, and $\bar{x}_9$ included in the second area 1332 of the sub-pixel array 1330. Also, $[R_{i,j_c}]$ is a 4×4 matrix.

In Equation 8 above, may be expressed according to Equation 9 below.

$$\{\hat{s}_i\} = \{\bar{s}_i\} - [[R_{i,j_a}] \; [R_{i,j_b}]]\begin{Bmatrix} \bar{x}_{j_a} \\ \bar{x}_{j_b} \end{Bmatrix} \qquad \text{[Equation 9]}$$

In order to obtain the values additionally needed in order to convert the super-pixel array into the sub-pixel array, the sensing circuit may apply the electrical signal to a separate driving electrode and select a separate detection electrode to separately activate one or more nodes in an integrated activation area.

The image data processing apparatus may receive the mutual capacitances corresponding to the one or more nodes separately activated and convert the received mutual capacitances into sub-pixels, thereby obtaining values of the sub-pixels (hereinafter, values of the first sub-pixels) included in the sub-pixel array. That is, the image data processing apparatus may obtain the values of the first sub-pixels from the one or more nodes that are separately activated.

Referring to Equation 9, $$\begin{Bmatrix} \bar{x}_{j_a} \\ \bar{x}_{j_b} \end{Bmatrix}$$

is a matrix representing the values of the first sub-pixels and having a size of $\{(p-1)(N+q-1)+M(q-1)\}\times 1$. Also, $[[R_{i,j_a}] \; [R_{i,j_b}]]$ is a relationship matrix representing a relationship between the super-pixels and the first sub-pixels and having a size of $MN\times\{(p-1)(N+q-1)+M(q-1)\}$.

Referring to FIG. 13

$$\begin{Bmatrix} \bar{x}_{j_a} \\ \bar{x}_{j_b} \end{Bmatrix}$$

is a matrix having a 5×1 size indicating 5 first sub-pixels $\bar{x}_1$ through $\bar{x}_3$, $\bar{x}_4$, and $\bar{x}_7$ and $[[R_{i,j_a}] \; [R_{i,j_b}]]$ is a matrix having a 4×5 size and representing a relationship between the 4 super-pixels $\bar{S}_1$ through $\bar{S}_4$ and the 5 first sub-pixels $\bar{x}_1$ through $\bar{x}_3$, $\bar{x}_4$, and $\bar{x}_7$.

Meanwhile, each of $[R_{i,j_a}]$ and $[R_{i,j_b}]$ of Equation 9 may be expressed according to Equation 10 below.

$$[R_{i,j_a}] = [\{R_{i,1}\}\{R_{i,2}\}\cdots\{R_{i,(p-1)(N+q-1)}\}] \qquad \text{[Equation 10]}$$

$$[R_{i,j_b}] = \begin{bmatrix} \\ \{R_{i,(p-1)(N+q-1)+1}\}, \cdots, \{R_{i,(p-1)(N+q-1)+q-1}\}, \\ \{R_{i,p(N+q-1)+1}\}, \cdots, \{R_{i,p(N+q-1)+q-1}\}, \\ \cdots, \\ \{R_{i,(M+p-2)(N+q-1)+1}\}\cdots\{R_{i,(M+p-2)(N+q-1)+q-1}\} \end{bmatrix}$$

Referring to Equation 8 again, $\{\bar{x}_{j_c}\}$ of Equation 8 is a sub-pixel vector having a MN×1 size, a value of which is to be calculated. The term $\{\bar{x}_{j_c}\}$ of Equation 8 may be expressed according to Equation 11 by using an inverse matrix with respect to Equation 9.

$$\{\bar{x}_{j_c}\} = \qquad \text{[Equation 11]}$$
$$[R_{i,j_c}]^{-1}\{\hat{s}_i\} = [R_{i,j_c}]^{-1}\left(\{\bar{s}_i\} - [[R_{i,j_a}] \; [R_{i,j_b}]]\begin{Bmatrix} \bar{x}_{j_a} \\ \bar{x}_{j_b} \end{Bmatrix}\right)$$

Figure 14:
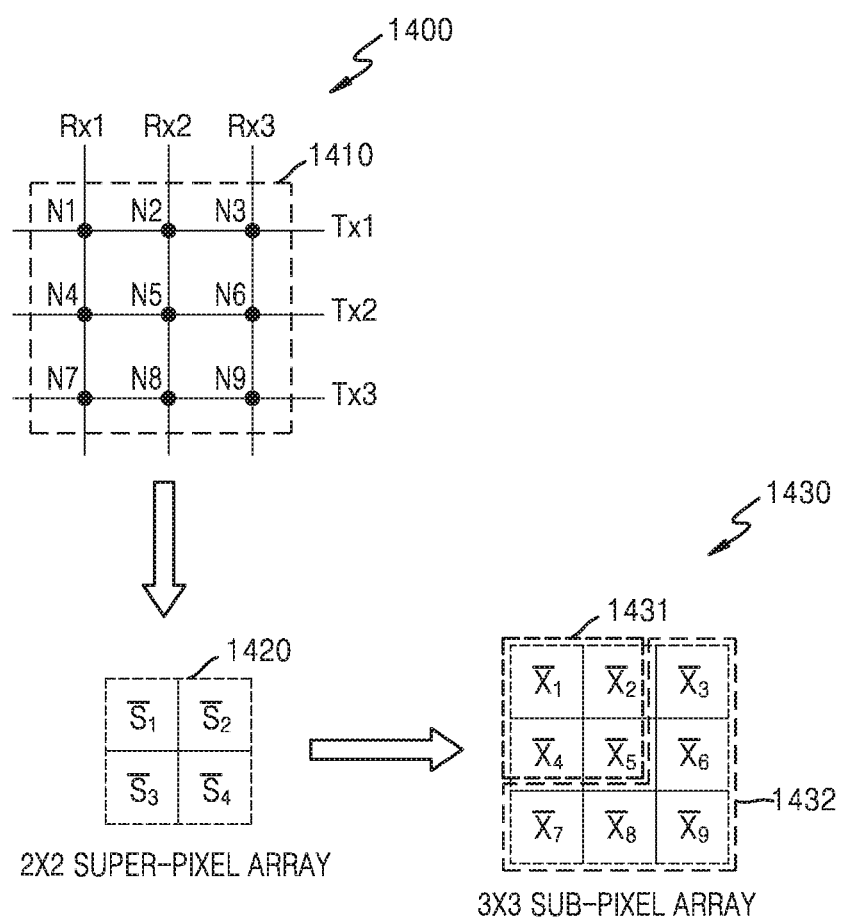
FIG. 14 is a diagram for explaining a method of converting a super-pixel array into a sub-pixel array, according to an exemplary embodiment.

FIG. 14 is a diagram for explaining a method of converting a super-pixel array 1420 into a sub-pixel array 1430, according to an exemplary embodiment.

Referring to FIG. 14, in order to obtain values additionally needed to convert the super-pixel array 1420 into the sub-pixel array 1430, a sensing circuit 1400 may apply an electrical signal to a separate driving electrode Tx and select a separate detection electrode Rx, to separately activate one or more nodes in an integrated activation area 1410. Here, the integrated activation area 1410 is an area including all of nodes N1 through N9 on the sensing circuit 1400, which are used to generate the super-pixel array 1420.

An image data processing apparatus may receive mutual capacitances corresponding to the one or more nodes separately activated and convert the received mutual capacitances into sub-pixels, thereby obtaining values of the sub-pixels included in the sub-pixel array 1430.

According to an exemplary embodiment, the image data processing apparatus may obtain values of five (5) first sub-pixels $\bar{x}_3$, and $\bar{x}_6$ through $\bar{x}_9$ included in a first area 1431 of the sub-pixel array 1430. In this case, the image data processing apparatus may calculate values of four (4) second sub-pixels $\bar{x}_1$, $\bar{x}_2$, $\bar{x}_4$, and $\bar{x}_5$ included in a second area 1432 of the sub-pixel array 1430, by using 4 super-pixels $\bar{S}_1$ through $\bar{S}_4$ included in the super-pixel array 1420 and the values of the 5 first-sub pixels $\bar{x}_3$, and $\bar{x}_6$ through $\bar{x}_9$.

That is, since the values of the 5 first sub-pixels $\bar{x}_3$, and $\bar{x}_6$ through $\bar{x}_9$ from among the nine (9) sub-pixels $\bar{x}_1$ through $\bar{x}_9$ of Equation 3 are obtained by using the process described above, the values of the 4 second sub-pixels $\bar{x}_1$, $\bar{x}_2$, $\bar{x}_4$, and $\bar{x}_5$ included in the second area 1432 of the sub-pixel array 1430 may be calculated by Equation 12 below.

$$\bar{S}_1 = \bar{x}_1 + \bar{x}_2 + \bar{x}_4 + \bar{x}_5$$

$$\bar{S}_2 - (\bar{x}_3 + \bar{x}_6) = \bar{x}_2 + \bar{x}_5$$

$$\bar{S}_3 - (\bar{x}_7 + \bar{x}_8) = \bar{x}_4 + \bar{x}_5$$

$$\bar{S}_4 - (\bar{x}_6 + \bar{x}_8 + \bar{x}_9) = \bar{x}_5 \qquad \text{[Equation 12]}$$

Referring to FIG. 12, the pre-obtained 4 super-pixels $\overline{S}_1$ through $\overline{S}_4$ and the values of the 5 first sub-pixels $\overline{x}_3$, and $\overline{x}_6$ through $\overline{x}_9$ may be shifted to the left side and the four equations may be solved to calculate the values of the 4 second sub-pixels $\overline{x}_1$, $\overline{x}_2$, $\overline{x}_4$, and $\overline{x}_5$.

The 4 equations of Equation 12 may be represented via a matrix equation according to Equation 13.

$$\underbrace{\begin{bmatrix} \overline{S}_1 \\ \overline{S}_2 \\ \overline{S}_3 \\ \overline{S}_4 \end{bmatrix}}_{\{\overline{s}_i\}} - \begin{bmatrix} 0 & 0 & 0 & 0 & 0 \\ 1 & 1 & 0 & 0 & 0 \\ 0 & 0 & 1 & 1 & 0 \\ 0 & 1 & 0 & 1 & 1 \end{bmatrix} \begin{bmatrix} \overline{x}_3 \\ \overline{x}_6 \\ \overline{x}_7 \\ \overline{x}_8 \\ \overline{x}_9 \end{bmatrix} = \underbrace{\begin{bmatrix} 1 & 1 & 1 & 1 \\ 0 & 1 & 0 & 1 \\ 0 & 0 & 1 & 1 \\ 0 & 0 & 0 & 1 \end{bmatrix}}_{[R_{i,j_a}]} \underbrace{\begin{bmatrix} \overline{x}_1 \\ \overline{x}_2 \\ \overline{x}_4 \\ \overline{x}_5 \end{bmatrix}}_{\{\overline{x}_{j_a}\}} \quad \text{[Equation 13]}$$

The descriptions with respect to FIG. 13 will be referred to for the formulas included in Equation 13.

Figure 15:
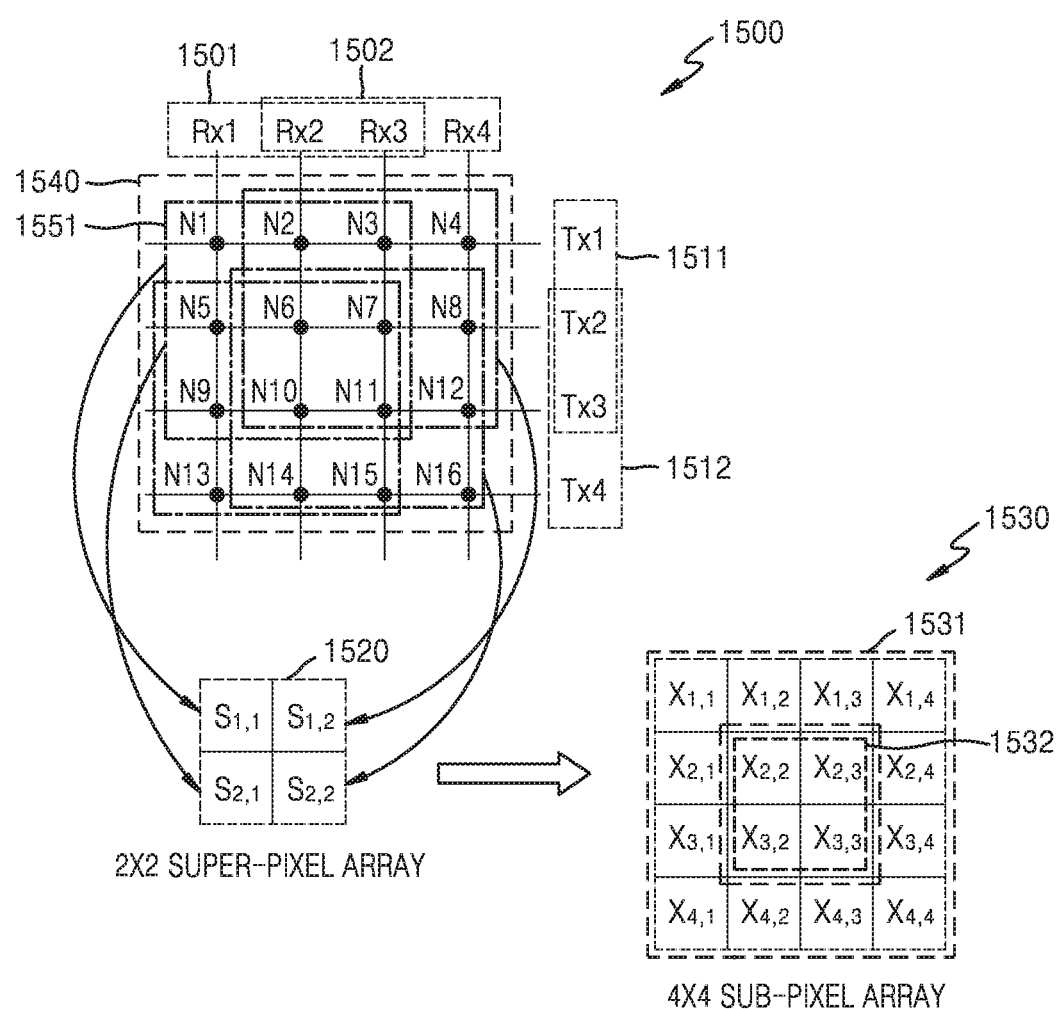
FIG. 15 is a diagram for explaining a schematic method of converting a super-pixel array into a sub-pixel array, according to an exemplary embodiment.

FIG. 15 is a diagram for explaining a schematic method of converting a super-pixel array into a sub-pixel array, according to an exemplary embodiment.

Sixteen (16) nodes N1 through N16 may be formed by each of the plurality of driving electrodes Tx1 through Tx4 and each of the plurality of detection electrodes Rx1 through Rx4 crossing each other, the plurality of driving electrodes Tx1 through Tx4 and the plurality of detection electrodes Rx1 through Rx4 being included in a sensing circuit 1500. In order to increase the sensing sensitivity, the sensing circuit 1500 may control the plurality of driving electrodes Tx1 through Tx4 as a plurality of driving groups and sequentially apply electrical signals to the plurality of driving groups, and may control the plurality of detection electrodes Rx1 through Rx4 as a plurality of detection groups and sequentially detect electrical signals from the plurality of detection groups.

The sensing circuit 1500 may group the driving electrodes Tx1 through Tx3 into a first driving group 1511 and group the driving electrodes Tx2 through Tx4 into a second driving group 1512. In the same manner, the sensing circuit 1500 may group the detection electrodes Rx1 through Rx3 into a first detection group 1501 and group the detection electrodes Rx2 through Rx4 into a second detection group 1502.

According to an exemplary embodiment, when an electrical signal is applied to the first driving group 1511 and the first detection group 1501 is activated, all of the plurality of nodes N1 through N3, N5 through N7, and N9 through N11 included in a separate activation area 1551 are activated, and thus, the signal receiving unit RU may measure a mutual capacitance with respect to all of the plurality of nodes N1 through N3, N5 through N7, and N9 through N11 that are activated. That is, the mutual capacitance measured by the signal receiving unit RU may be a sum of a plurality of mutual capacitances corresponding to the plurality of nodes N1 through N3, N5 through N7, and N9 through N11, respectively. An image data processing apparatus may receive, from the signal receiving unit RU of the sensing circuit 1500, the mutual capacitance with respect to all of the plurality of nodes N1 through N3, N5 through N7, and N9 through N11 that are activated, and may convert the received mutual capacitance into a super-pixel $S_{1,1}$.

The image data processing apparatus may obtain a plurality of super-pixels $S_{1,1}$, $S_{1,2}$, $S_{2,1}$, and $S_{2,2}$ by using this method, and may generate image data of a super-pixel array 1520 having a 2×2 size and including the plurality of super-pixels $S_{1,1}$, $S_{1,2}$, $S_{2,1}$, and $S_{2,2}$.

According to an exemplary embodiment, when a size of the separate activation area is p×q and the number of nodes is (M+p−1)×(N+q−1), the size of the super-pixel array 1520 may be M×N. M and p may denote a natural number that is greater than or equal to 2, and M may be greater than p. N and q may denote a natural number that is greater than equal to 2, and N may be greater than q. Referring to FIG. 15, since a size of the separate activation area 1551 is 3×3 and the number of nodes included in the sensing circuit 1500 is 4×4, the size of the super-pixel array 1520 becomes 2×2.

The image data processing apparatus may convert the super-pixel array 1520 having the 2×2 size into the sub-pixel array 1530 having a 4×4 size. In order to convert the super-pixel array 1520 into the sub-pixel array 1530, at least twelve (12) values related to the sub-pixel array 1530 may have to be additionally obtained, in addition to the pre-obtained 4 super-pixels $S_{1,1}$, $S_{1,2}$, $S_{2,1}$, and $S_{2,2}$.

In order to obtain the values additionally required to convert the super-pixel array 1520 into the sub-pixel array 1530, the sensing circuit 1500 may apply an electrical signal to the separate driving electrode Tx and activate the separate detection electrode Rx to separately activate one or more nodes in an integrated activation area 1540. Meanwhile, the integrated activation area 1540 may be an area including all of the nodes N1 through N16 on the sensing circuit 1500, used to generate the super-pixel array 1520.

According to an exemplary embodiment, the image data processing apparatus may obtain values of 12 first sub-pixels $x_{1,1}$, through $x_{1,4}$, $x_{2,1}$, $x_{2,4}$, $x_{3,1}$, $x_{3,4}$, and $x_{4,1}$ through $x_{4,4}$ included in a first area 1531 of the sub-pixel array 1530. FIG. 15 illustrates that the first area 1531 includes twelve (12) sub-pixels located at an edge of the sub-pixel array 1530, but the location of the first area 1531 in the sub-pixel array 1530 is not limited thereto.

The image data processing apparatus may calculate values of four (4) second sub-pixels $x_{2,2}$, $x_{2,3}$, $x_{3,2}$, and $x_{3,3}$ included in a second area 1532 of the sub-pixel array 1530, by using the 4 super-pixels $S_{1,1}$, $S_{1,2}$, $S_{2,1}$, and $S_{2,2}$ and the values of the 12 first sub-pixels $x_{1,1}$, through $x_{1,4}$, $x_{2,1}$, $x_{2,4}$, $x_{3,1}$, $x_{3,4}$, and $x_{4,1}$ through $x_{4,4}$. The image data processing apparatus may convert the super-pixel array 1520 having the 2×2 size into the sub-pixel array 1530 having the 4×4 size by using the values of the 12 first sub-pixels $x_{1,1}$, through $x_{1,4}$, $x_{2,1}$, $x_{2,4}$, $x_{3,1}$, $x_{3,4}$, and $x_{4,1}$ through $x_{4,4}$ and the values of the 4 second sub-pixels $x_{2,2}$, $x_{2,3}$, $x_{3,2}$, and $x_{3,3}$.

Figure 16:
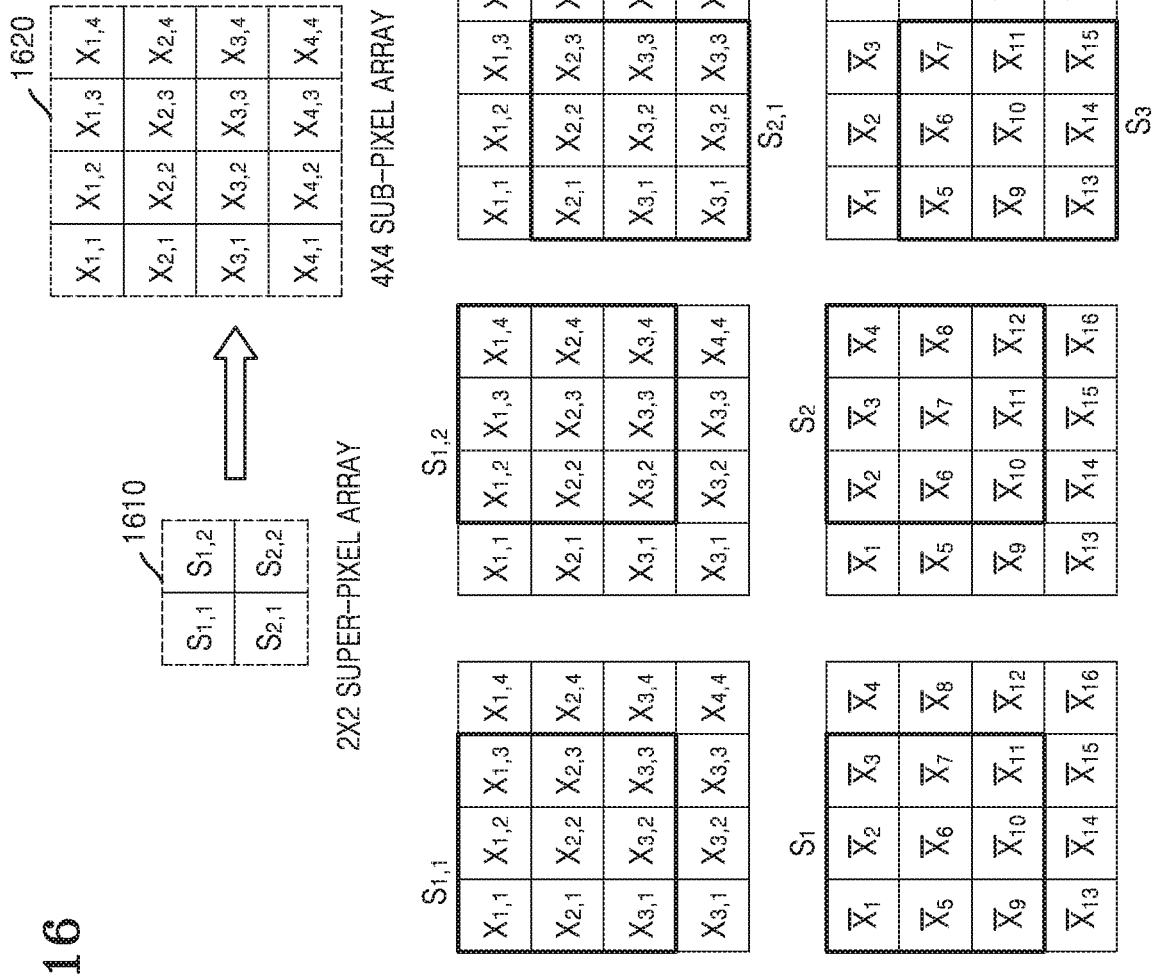
FIG. 16 is a diagram for explaining a relationship between super-pixels and sub-pixels, according to an exemplary embodiment.

FIG. 16 is a diagram for explaining a relationship between super-pixels and sub-pixels, according to an exemplary embodiment.

An image data processing apparatus may convert a super-pixel array into a sub-pixel array. As described above in detail with reference to FIG. 15, the image data processing apparatus may convert a super-pixel array 1610 having a 2×2 size into a sub-pixel array 1620 having a 4×4 size. Referring to FIG. 16, the relationship between the super-pixels included in the super-pixel array 1610 and the sub-pixels included in the sub-pixel array 1620 may be expressed according to Equation 14 below.

$$S_{1,1} = x_{1,1} + x_{1,2} + x_{1,3} + x_{2,1} + \quad \text{[Equation 14]}$$
$$x_{2,2} + x_{2,3} + x_{3,1} + x_{3,2} + x_{3,3} = \sum_{i=1}^{3} \sum_{j=1}^{3} x_{i,j}$$

-continued $$S_{1,2} = x_{1,2} + x_{1,3} + x_{1,4} + x_{2,2} + x_{2,3} + x_{2,4} +$$
$$x_{3,2} + x_{3,3} + x_{3,4} = \sum_{i=1}^{3}\sum_{j=2}^{4} x_{i,j}$$

$$S_{2,1} = x_{2,1} + x_{2,2} + x_{2,3} + x_{3,1} + x_{3,2} + x_{3,3} +$$
$$x_{4,1} + x_{4,2} + x_{4,3} = \sum_{i=2}^{4}\sum_{j=1}^{3} x_{i,j}$$

$$S_{2,2} = x_{2,2} + x_{2,3} + x_{2,4} + x_{3,2} + x_{3,3} + x_{3,4} +$$
$$x_{4,2} + x_{4,3} + x_{4,4} = \sum_{i=2}^{4}\sum_{j=2}^{4} x_{i,j}$$

When a size of a separate activation area is p×q and a size of the super-pixel array 1610 is M×N, the relationship between the super-pixels having a M×N array and the sub-pixels having a (M+p−1)×(N+q−1) array is generally represented by $S_{m,n} = \sum_{i=m}^{m+p-1}\sum_{j=n}^{n+q-1} x_{i,j}$ (Here, m=1, 2, . . . , M, n=1, 2, . . . , N), having a (M×N)×[(M+p−1)×(N+q−1)] array. The relationship between the super-pixels and the sub-pixels, which is represented by Equation 14, may be represented via a matrix equation according to Equation 15.

$$\begin{bmatrix} S_{1,1} \\ S_{1,2} \\ S_{2,1} \\ S_{2,2} \end{bmatrix} = \quad \text{[Equation 15]}$$

$$\begin{bmatrix} 1 & 1 & 1 & 0 & 1 & 1 & 1 & 0 & 1 & 1 & 1 & 0 & 0 & 0 & 0 & 0 \\ 0 & 1 & 1 & 1 & 0 & 1 & 1 & 1 & 0 & 1 & 1 & 1 & 0 & 0 & 0 & 0 \\ 0 & 0 & 0 & 0 & 1 & 1 & 1 & 0 & 1 & 1 & 1 & 0 & 1 & 1 & 1 & 0 \\ 0 & 0 & 0 & 0 & 0 & 1 & 1 & 1 & 0 & 1 & 1 & 1 & 0 & 1 & 1 & 1 \end{bmatrix}$$

$$\begin{bmatrix} x_{1,1} \\ x_{1,2} \\ x_{1,3} \\ x_{1,4} \\ x_{2,1} \\ x_{2,2} \\ x_{2,3} \\ x_{2,4} \\ x_{3,1} \\ x_{3,2} \\ x_{3,3} \\ x_{3,4} \\ x_{4,1} \\ x_{4,2} \\ x_{4,3} \\ x_{4,4} \end{bmatrix}$$

The relationship between the super-pixels and the sub-pixels may be represented as a vector. In this case, the relationship between the super-pixels included in the super-pixel array 1610 and the sub-pixels included in the sub-pixel array 1620 may be expressed according to Equation 16 below.

$$\overline{S}_1 = \overline{x}_1 + \overline{x}_2 + \overline{x}_3 + \overline{x}_5 + \overline{x}_6 + \overline{x}_7 + \overline{x}_9 + \overline{x}_{10} + \overline{x}_{11} = \quad \text{[Equation 16]}$$
$$\sum_{i=1}^{3}\sum_{j=1}^{3} \overline{x}_{4(i-1)+j}$$

$$\overline{S}_2 = \overline{x}_2 + \overline{x}_3 + \overline{x}_4 + \overline{x}_6 + \overline{x}_7 + \overline{x}_8 + \overline{x}_{10} + \overline{x}_{11} + \overline{x}_{12} =$$
$$\sum_{i=1}^{3}\sum_{j=2}^{4} \overline{x}_{4(i-1)+j}$$

$$\overline{S}_3 = \overline{x}_5 + \overline{x}_6 + \overline{x}_7 + \overline{x}_9 + \overline{x}_{10} + \overline{x}_{11} + \overline{x}_{13} + \overline{x}_{14} + \overline{x}_{15} =$$
$$\sum_{i=2}^{4}\sum_{j=1}^{3} \overline{x}_{4(i-1)+j}$$

$$\overline{S}_4 = \overline{x}_6 + \overline{x}_7 + \overline{x}_8 + \overline{x}_{10} + \overline{x}_{11} + \overline{x}_{12} + \overline{x}_{14} + \overline{x}_{15} + \overline{x}_{16} =$$
$$\sum_{i=2}^{4}\sum_{j=2}^{4} \overline{x}_{4(i-1)+j}$$

The image data processing apparatus may convert the mutual capacitances corresponding to the plurality of nodes included in the separate activation area on the sensing circuit into the super-pixels. When the size of the separate activation area is p×q and the size of the super-pixel array 1610 is M×N, the vectorial relationship between the super-pixels and the sub-pixels, represented by Equation 16, may be generally represented by $\overline{S}_{N(m-1)+n} = \sum_{i=m}^{m+p-1}\sum_{j=n}^{n+q-1} \overline{x}_{(N+q-1)(i-1)+j}$ (Here, m=1, 2, . . . , M, n=1, 2, . . . , N).

The relationship between the super-pixel array 1610 and the sub-pixel array 1620, represented by Equation 16, may be represented via a matrix equation according to Equation 17.

$$\begin{bmatrix} \overline{S}_1 \\ \overline{S}_2 \\ \overline{S}_3 \\ \overline{S}_4 \end{bmatrix} = \quad \text{[Equation 17]}$$

$$\begin{bmatrix} 1 & 1 & 1 & 0 & 1 & 1 & 1 & 0 & 1 & 1 & 1 & 0 & 0 & 0 & 0 & 0 \\ 0 & 1 & 1 & 1 & 0 & 1 & 1 & 1 & 0 & 1 & 1 & 1 & 0 & 0 & 0 & 0 \\ 0 & 0 & 0 & 0 & 1 & 1 & 1 & 0 & 1 & 1 & 1 & 0 & 1 & 1 & 1 & 0 \\ 0 & 0 & 0 & 0 & 0 & 1 & 1 & 1 & 0 & 1 & 1 & 1 & 0 & 1 & 1 & 1 \end{bmatrix} \begin{bmatrix} \overline{x}_1 \\ \overline{x}_2 \\ \overline{x}_3 \\ \overline{x}_4 \\ \overline{x}_5 \\ \overline{x}_6 \\ \overline{x}_7 \\ \overline{x}_8 \\ \overline{x}_9 \\ \overline{x}_{10} \\ \overline{x}_{11} \\ \overline{x}_{12} \\ \overline{x}_{13} \\ \overline{x}_{14} \\ \overline{x}_{15} \\ \overline{x}_{16} \end{bmatrix}$$

Hereinafter, the method of converting the super-pixel array into the sub-pixel array will be described, based on the vectorial relationship between the super-pixels and the sub-pixels, for convenience of explanation.

Figure 17:
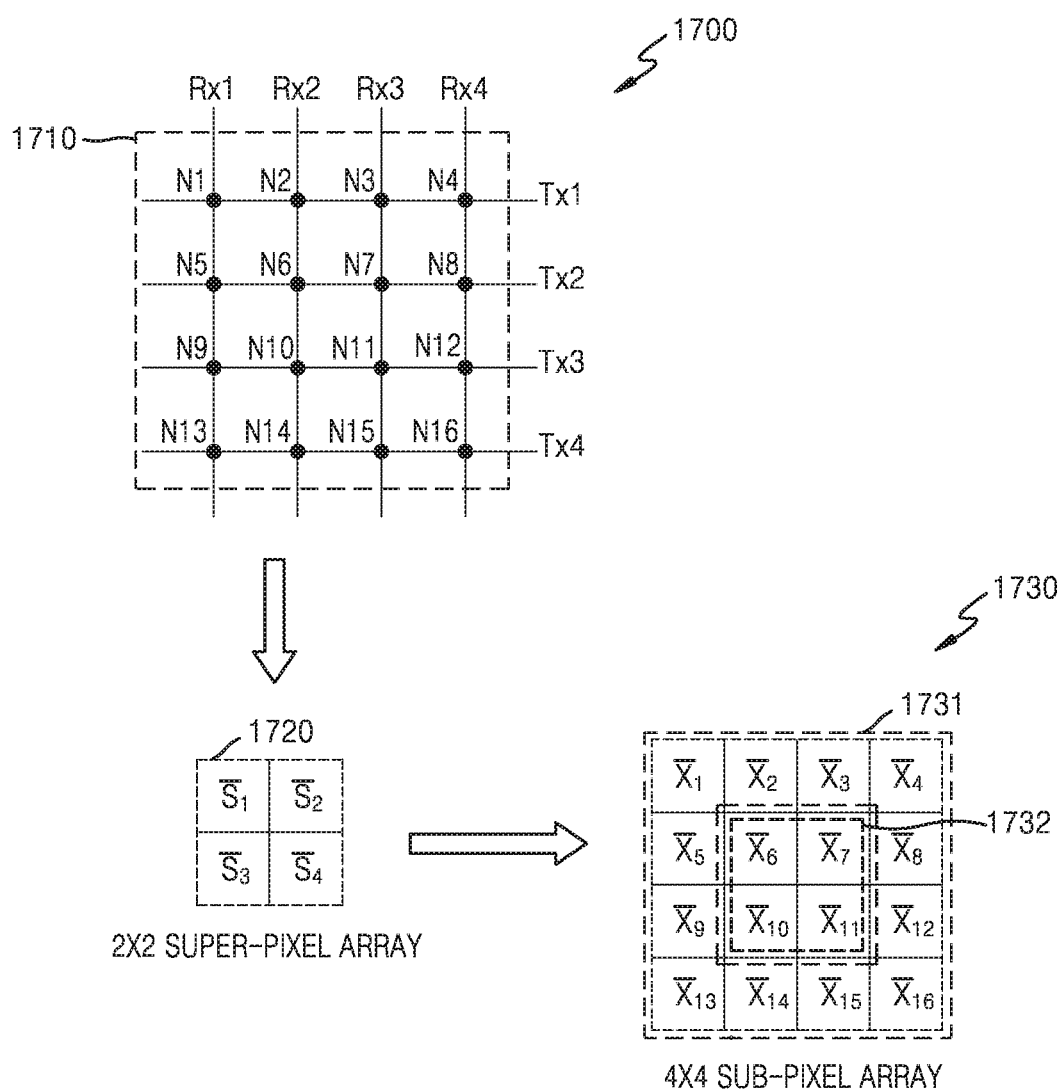
FIG. 17 is a diagram for explaining a method of converting a super-pixel array into a sub-pixel array, according to an exemplary embodiment.

FIG. 17 is a diagram for explaining a method of converting a super-pixel array 1720 into a sub-pixel array 1730, according to an exemplary embodiment.

An image data processing apparatus may gather a plurality of driving electrodes into a plurality of driving groups and sequentially apply electrical signals to the plurality of driving groups, and may gather a plurality of detection electrodes into a plurality of detection groups and sequentially detect electrical signals from the plurality of detection groups.

When the electrical signal is applied to a particular driving group and a particular detection group is selected, a plurality of nodes included in an separate activation area may be activated and the image data processing apparatus may receive signals corresponding to a mutual capacitance with respect to all of the plurality of nodes that are activated and convert the received mutual capacitance into a super-pixel.

That is, referring to Equation 16 above, $\overline{S}_1, \overline{S}_2, \overline{S}_3$ and $\overline{S}_4$ indicating the super-pixels are determined values. However, since the values of the total sixteen (16) sub-pixels $\overline{x}_1$ through $\overline{x}_{16}$ in Equation 16 are not identified, it is needed to obtain at least twelve (12) values related to the sub-pixel array 1730, in order to convert the super-pixel array 1720 into the sub-pixel array 1730.

Referring to FIG. 17, in order to obtain the values additionally needed to convert the super-pixel array 1720 into the sub-pixel array 1730, a sensing circuit 1700 may apply an electrical signal to a separate driving electrode Tx and select a separate detection electrode Rx, to separately activate one or more nodes in an integrated activation area 1710. The integrated activation area 1710 may include all of nodes N1 through N16 on the sensing circuit 1700, which are used to generate the super-pixel array 1720.

The image data processing apparatus may receive mutual capacitances corresponding to the nodes separately activated and convert the received mutual capacitances into sub-pixels, thereby obtaining values of the sub-pixels included in the sub-pixel array 1730.

According to an exemplary embodiment, the image data processing apparatus may obtain values of twelve (12) first sub-pixels $\overline{x}_1$ through $\overline{x}_4, \overline{x}_5, \overline{x}_8, \overline{x}_9, \overline{x}_{12}$, and $\overline{x}_{13}$ through $\overline{x}_{16}$ included in a first area 1731 of the sub-pixel array 1730. In this case, the image data processing apparatus may calculate values of four (4) second sub-pixels $\overline{x}_6, \overline{x}_7, \overline{x}_{10}$, and $\overline{x}_{11}$ included in a second area 1732 of the sub-pixel array 1730, by using the 4 super-pixels $\overline{S}_1$ through $\overline{S}_4$ and the values of the 12 first-sub pixels $\overline{x}_1$ through $\overline{x}_4, \overline{x}_5, \overline{x}_8, \overline{x}_9, \overline{x}_{12}$, and $\overline{x}_{13}$ through $\overline{x}_{16}$.

The image data processing apparatus may convert the super-pixel array 1720 having a 2×2 size into the sub-pixel array 1730 having a 4×4 size, by using the values of the 12 first sub-pixels $\overline{x}_1$ through $\overline{x}_4, \overline{x}_5, \overline{x}_8, \overline{x}_9, \overline{x}_{12}$, and $\overline{x}_{13}$ through $\overline{x}_{16}$ and the values of the 4 second-sub pixels $\overline{x}_6, \overline{x}_7, \overline{x}_{10}$, and $\overline{x}_{11}$.

Meanwhile, FIG. 13 may be referred to for the detailed process of converting the super-pixel array 1720 into the sub-pixel array 1730.

Figure 18:
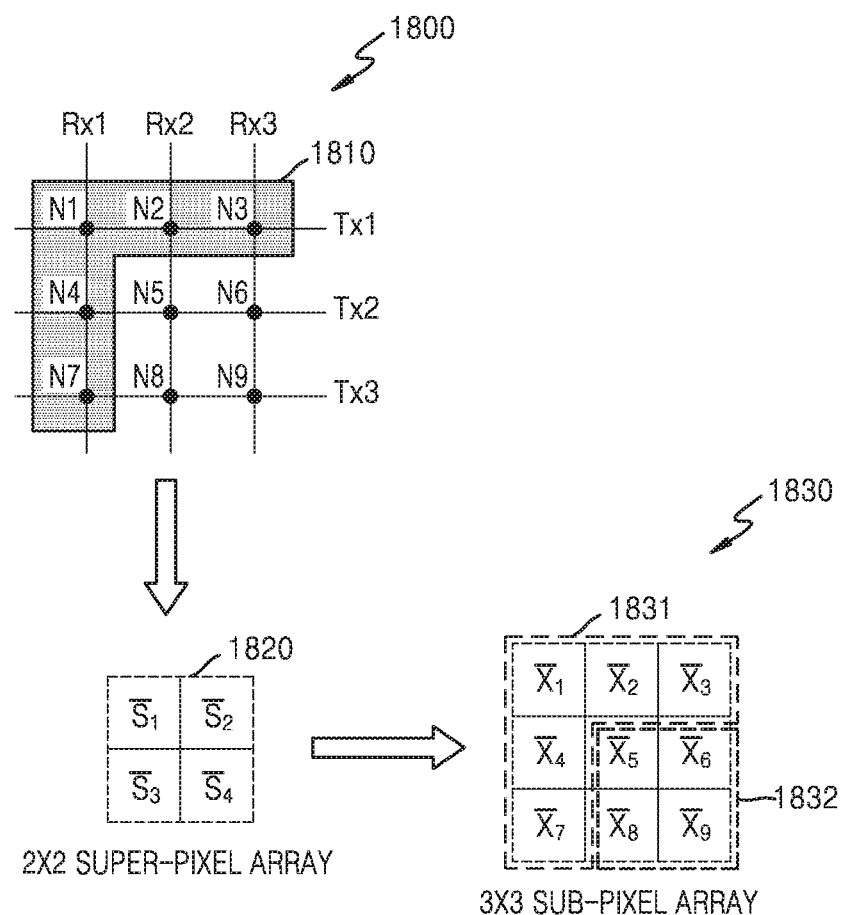
FIG. 18 is a diagram for explaining an example in which a fixed potential is applied to at least one of a driving electrode and a detection electrode of a sensing circuit, according to an exemplary embodiment.

FIG. 18 is a diagram for explaining an example in which a fixed potential is applied to at least one of a driving electrode and a detection electrode of a sensing circuit 1800, according to an exemplary embodiment.

Referring to FIG. 18, the sensing circuit 1800 may further include an electrode 1810 for applying a pre-set fixed potential to at least two nodes from among a plurality of nodes N formed on the sensing circuit 1800. The electrode 1810 may include indium tin oxide (ITO).

The electrode 1810 may be connected to ground. In this case, a potential of channels connected to the electrode 1810 is the same as a ground potential. However, the present specification is not limited thereto. Thus, the electrode 1810 may be connected to a certain power supply and the potential of the electrode 1810 may be maintained as a pre-set fixed potential through the power supply.

According to an exemplary embodiment, the electrode 1810 may apply a fixed potential to a plurality of nodes N1 through N4, and N7 located at an upper end and a left side of the sensing circuit 1800. When the electrode 1810 is grounded, the fixed potential value may be the same as a ground potential value. However, embodiments are not limited thereto. For example, when the electrode 1810 is connected to a certain power supply, the fixed potential value may be different from the ground potential value.

When a certain fixed potential is continually applied to the plurality of nodes N1 through N4, and N7 located on the upper end of the sensing circuit 1800, the mutual capacitances at the plurality of nodes N1 through N4, and N7 may not be changed. That is, regardless of a touch of a finger of a user, the mutual capacitances corresponding to the plurality of nodes N1 through N4, and N7 located on the upper end may be fixed.

Referring to FIG. 18, in order to convert a super-pixel array 1820 having a 2×2 size into a sub-pixel array 1830 having a 3×3 size, at least five (5) values related to the sub-pixel array has to be obtained, in addition to pre-obtained 4 super-pixels $\overline{S}_1$ through $\overline{S}_4$.

Here, the sensing circuit 1800 may apply the fixed potential to the plurality of nodes N1 through N4, and N7 located at the upper end and the left side of the sensing circuit 1800. In this case, the mutual capacitances corresponding to the plurality of nodes N1 through N4, and N7 located at the upper end are fixed regardless of the touch of the finger of the user, and thus, an image data processing apparatus may determine the values of the 5 first sub-pixels $\overline{x}_1$ through $\overline{x}_4$, and $\overline{x}_7$ included in a first area 1831 of the sub-pixel array 1830 as "0."

The image data processing apparatus may calculate values of four (4) second sub-pixels $\overline{x}_5, \overline{x}_6, \overline{x}_8$, and $\overline{x}_9$ included in a second area 1832 of the sub-pixel array 1830, by using the 4 super-pixels $\overline{S}_1$ through $\overline{S}_4$ and the values of the 5 first sub-pixels $\overline{x}_1$ through $\overline{x}_4$, and $\overline{x}_7$, the values of the 5 first sub-pixels $\overline{x}_1$ through $\overline{x}_4$, and $\overline{x}_7$ being determined as "0." By this process, the image data processing apparatus may convert the super-pixel array 1820 having the 2×2 size into the sub-pixel array 1830 having the 3×3 size.

Figure 19:
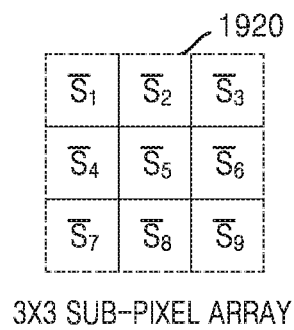
FIG. 19 is a diagram for explaining a method of representing a relationship between super-pixels and sub-pixels by activating only some of nodes included in a separate activation area, according to an exemplary embodiment.
Figure 19:
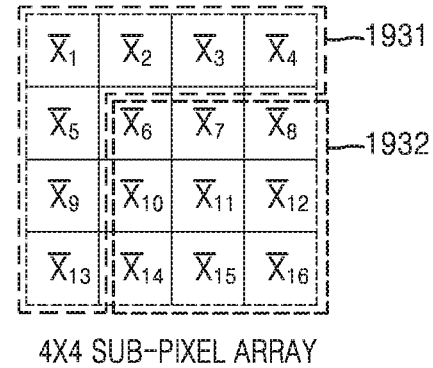
Figure 19:
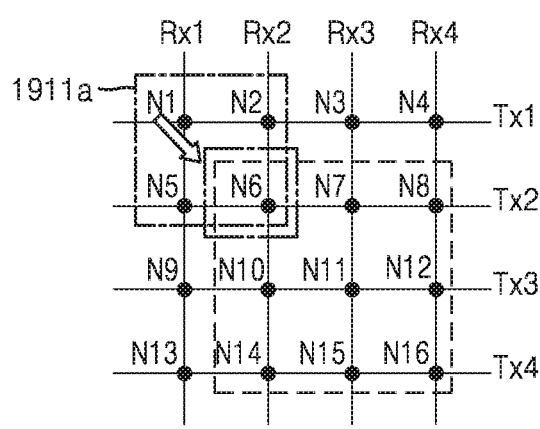
Figure 19:
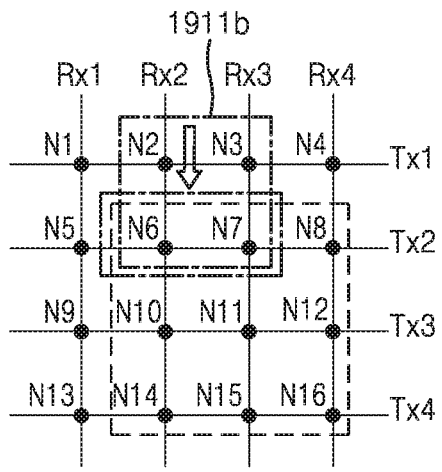
Figure 19:
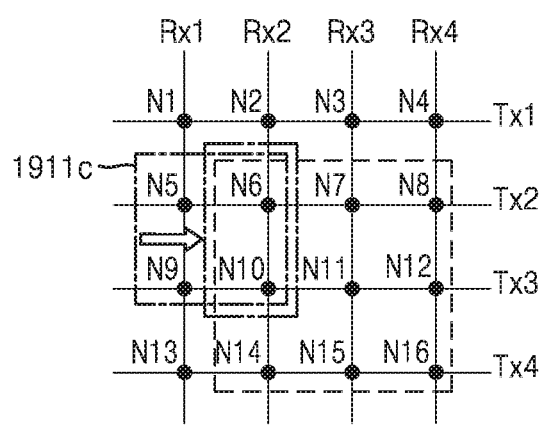
Figure 19:
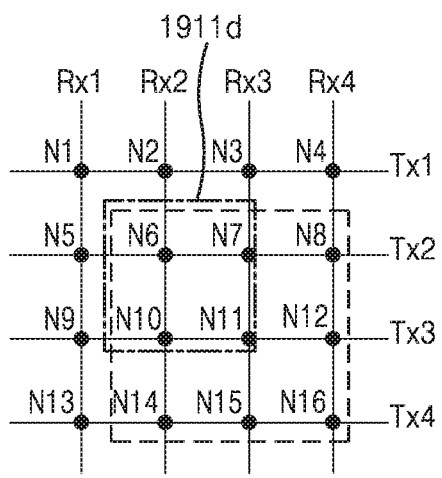

FIG. 19 is a diagram for explaining a method of representing a relationship between super-pixels and sub-pixels by activating only one or more nodes included in a separate activation area, according to an exemplary embodiment.

A sensing circuit may gather a plurality of driving electrodes Tx1 through Tx4 into a plurality of driving groups and sequentially apply electrical signals to a plurality of driving groups, and may gather a plurality of detection electrodes Rx1 through Rx4 into a plurality of detection groups and sequentially detect electrical signals from the plurality of detection groups.

When the electrical signal is applied to a separate driving group and a separate detection group is selected, all of a plurality of nodes included in separate activation areas 1911a through 1911d may be activated, so that a signal receiving unit may measure a mutual capacitance with respect to all of the plurality of nodes. That is, the mutual capacitance measured by the signal receiving unit may be a sum of mutual capacitances respectively corresponding to the plurality of nodes.

An image data processing apparatus may receive, from the signal receiving unit of the sensing circuit, the mutual capacitance with respect to all of the plurality of nodes that are activated, and may convert the received mutual capacitance into a super-pixel. Also, the image data processing apparatus may generate image data of a super-pixel array 1920 including a plurality of super-pixels.

The image data processing apparatus may convert the super-pixel array 1920 having a 3×3 size into a sub-pixel array 1930 having a 4×4 size. Nine (9) super-pixels $\overline{S}_1$ through $\overline{S}_9$ included in the super-pixel array 1920 are determined values. However, in order to obtain sixteen (16) sub-pixels $\overline{x}_1$ through $\overline{x}_{16}$ by using the 9 super-pixels $\overline{S}_1$ through $\overline{S}_9$, at least seven (7) values related to the sub-pixel array 1930 may have to be obtained.

A plurality of sub-pixels included in the sub-pixel array 1930 correspond to a plurality of nodes of the sensing circuit, respectively. For example, the sub-pixels $\overline{x}_1$ through $\overline{x}_{16}$ may correspond to the nodes N1 through N16 of the sensing circuit, respectively. Also, the sub-pixel array 1930 may be divided into a first area 1931 and a second area 1932. The first area 1931 may include seven (7) first sub-pixels $\overline{x}_1$ through $\overline{x}_5$, $\overline{x}_9$, and $\overline{x}_{13}$, and the second area 1932 may include nine (9) second sub-pixels $\overline{x}_6$ through $\overline{x}_8$, $\overline{x}_{10}$ through $\overline{x}_{12}$, and $\overline{x}_{14}$ through $\overline{x}_{16}$.

In order to obtain the values of the 7 first sub-pixels $\overline{x}_1$ through $\overline{x}_5$, $\overline{x}_9$, and $\overline{x}_{13}$, the image data processing apparatus may activate only the nodes corresponding to the second sub-pixels $\overline{x}_6$ through $\overline{x}_8$, $\overline{x}_{10}$ through $\overline{x}_{12}$, and $\overline{x}_{14}$ through $\overline{x}_{16}$ from among the plurality of nodes in the separate activation areas 1911a through 1911d, so that super pixels may be obtained.

Referring to FIG. 19, only the node N6 from among the plurality of nodes N1, N2, N5, and N6 in the separate activation area 1911a corresponds to the second sub-pixel, and thus, the image data processing apparatus may obtain the super-pixel $\overline{S}_1$ by activating only the node N6. Also, only the nodes N6 and N7 from among the plurality of nodes N2, N3, N6, and N7 in the separate activation area 1911b correspond to the second sub-pixel, and thus, the image data processing apparatus may obtain the super-pixel $\hat{S}_2$ by activating only the nodes N6 and N7. Also, only the nodes N6 and N10 from among the plurality of nodes N5, N6, N9, and N10 in the separate activation area 1911c correspond to the second sub-pixel, and thus, the image data processing apparatus may obtain the super-pixel $\overline{S}_4$ by activating only the nodes N6 and N10. Also, all of the plurality of nodes N6, N7, N10, and N11 in the separate activation area 1911d correspond to the second sub-pixel, and thus, the image data processing apparatus may activate the nodes N6, N7, N10, and N11 to obtain the super-pixel $\overline{S}_5$.

The image data processing apparatus may represent the relationship between the super-pixels and the sub-pixels by Equations 3, 4, 14, and 15, based on the process described above in detail. FIGS. 12 and 16 will be referred to for the method of representing the relationship between the super-pixels and the sub-pixels.

Figure 20:
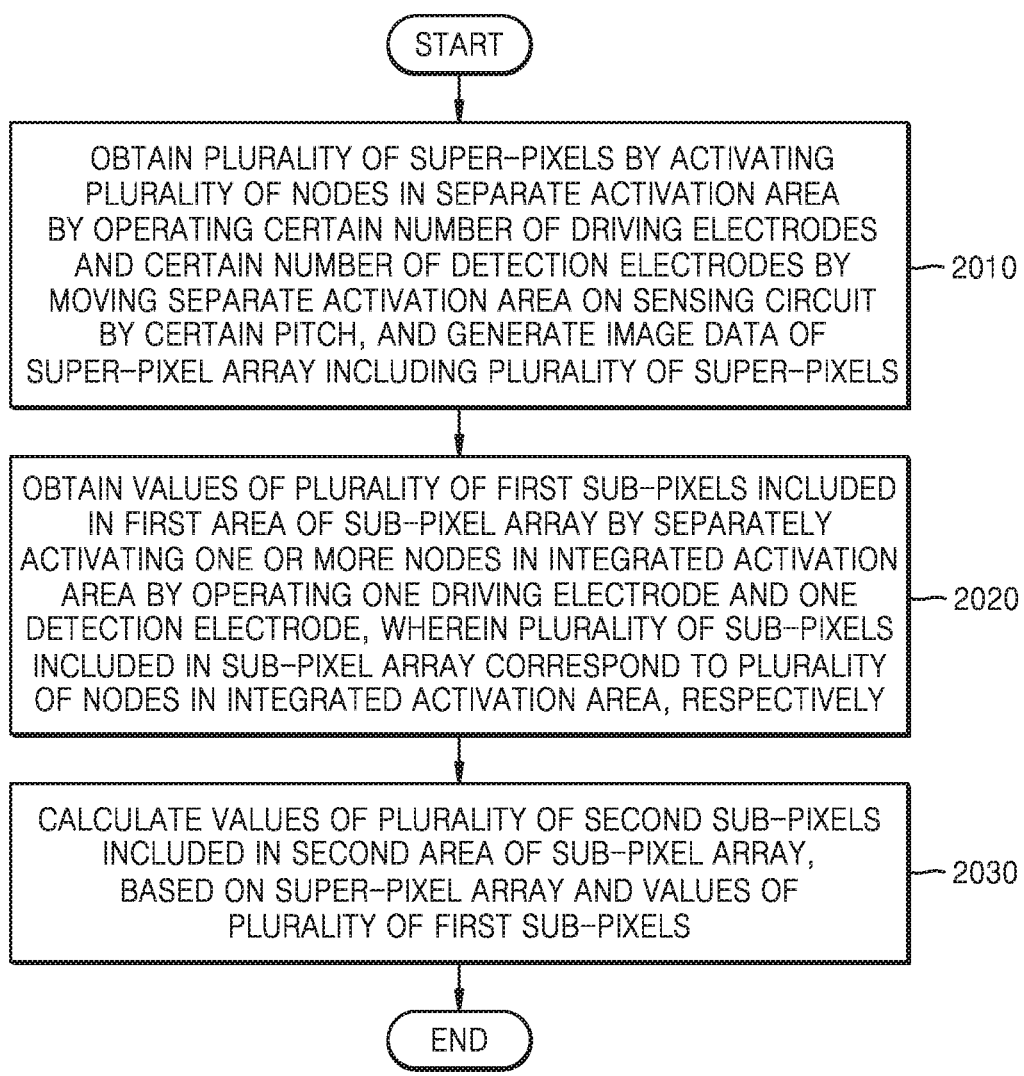
FIG. 20 is a flowchart of a method of converting image data of a super-pixel array into image data of a sub-pixel array, according to an exemplary embodiment.

FIG. 20 is a flowchart of a method of converting image data of a super-pixel array into image data of a sub-pixel array, according to an exemplary embodiment.

According to an exemplary embodiment, an image data processing apparatus may include a sensing circuit. The image data processing apparatus may obtain a plurality of super-pixels and a plurality of sub-pixels from the sensing circuit by controlling the sensing circuit. According to another embodiment, the sensing circuit may be located outside the image data processing apparatus. The image data processing apparatus may receive data related to the plurality of super-pixels and the plurality of sub-pixels from the sensing circuit.

Hereinafter, an exemplary embodiment in which the sensing circuit is included in the image data processing apparatus will be described for convenience of explanation.

Referring to FIG. 20, in operation S2010, the image data processing apparatus may operate a certain number of driving electrodes and a certain number of detection electrodes by moving a separate activation area on the sensing circuit by a certain pitch, to activate a plurality of nodes in the separate activation area, in order to obtain a plurality of super-pixels.

Also, the image data processing apparatus may generate image data of a super-pixel array including the plurality of super-pixels.

According to an exemplary embodiment, the separate activation area may be moved by a certain pitch on the sensing circuit. Here, the term "pitch" is a unit of a movement distance indicating the number of nodes through which the separate activation area shifts when the separate activation area is moved on the sensing circuit. When the separate activation area is moved on the sensing circuit by a certain pitch, the plurality of nodes included in the separate activation area may become changed.

The sensing circuit may gather a plurality of driving electrodes into a plurality of driving groups and gather a plurality of detection electrodes into a plurality of detection groups. The image data processing apparatus may sequentially apply electrical signals to the plurality of driving groups and may sequentially detect electrical signals from the plurality of detection groups, by controlling the sensing circuit.

When the electrical signal is applied to a particular driving group including a certain number of driving electrodes and a particular detection group including a certain number of detection electrodes is selected, all of a plurality of nodes included in the separate activation area on the sensing circuit all activated, and thus, the image data processing apparatus may measure a mutual capacitance with respect to all of the plurality of nodes. That is, the mutual capacitance measured by the image data processing apparatus may be a sum of a plurality of mutual capacitances corresponding to the plurality of nodes, respectively.

The image data processing apparatus may convert the mutual capacitances into super-pixels. Also, the image data processing apparatus may generate the image data of the super-pixel array including the plurality of super-pixels.

The image data processing apparatus may improve the sensitivity of the sensing circuit by applying the electrical signal to the driving group and selecting the detection group by controlling the sensing circuit. Also, as it will be described below with reference to operations S2020 through S2040, the image data processing apparatus may convert the image data of the super-pixel array into image data of a sub-pixel array, in order to increase the resolution of the image data of the super-pixel array.

In operation S2020, the image data processing apparatus may separately activate one or more nodes in an integrated activation area by operating one driving electrode and one detection electrode, and may obtain values of a plurality of first sub-pixels included in a first area of the sub-pixel array.

When the sensing circuit applies an electrical signal to the driving group and selects the detection group, the image data processing apparatus may obtain super-pixels from the sensing circuit and generate a super-pixel array by using the plurality of super-pixels. Sub-pixels may be obtained by applying an electrical signal to a separate driving electrode and selecting a separate detection electrode, and the image data processing apparatus may generate the sub-pixel array by using the plurality of sub-pixels. That is, according to a difference in the methods of generating the super-pixel array and the sub-pixel array, the super-pixel array has a smaller size than the sub-pixel array.

In order to convert the super-pixel array into the sub-pixel array, the image data processing apparatus has to obtain values of one or more sub-pixels included in the sub-pixel array. To this end, the image data processing apparatus may operate the separate driving electrode and the separate detection electrode to activate one or more nodes in the integrated activation area, to obtain the values of the plurality of first sub-pixels included in the first area of the sub-pixel array. Here, the integrated activation area may be an area including all of nodes on the sensing circuit that are used to generate the image data of the super-pixel array. Also, the plurality of sub-pixels included in the sub-pixel array may correspond to the plurality of nodes in the integrated activation area, respectively.

According to an exemplary embodiment, when a size of the super-pixel array is M×N and a size of the sub-pixel array is a×b (a>M, b>N), the image data processing apparatus may obtain values of (ab-MN) first sub-pixels in the sub-pixel array.

In operation S2030, the image data processing apparatus may calculate values of a plurality of second sub-pixels included in a second area of the sub-pixel array, based on the super-pixel array and the values of the plurality of first sub-pixels.

Also, the image data processing apparatus may convert the image data of the super-pixel array into the image data of the sub-pixel array by using calculated values of the plurality of second sub-pixels.

Since values of MN super-pixels included in the super-pixel array are identified by operation S2010 and the values of the ab-MN first sub-pixels included in the sub-pixel array are identified by operation S2020, the image data processing apparatus may calculate values of MN second sub-pixels included in the second area which is an area except for the first area.

The image data processing apparatus may use the values of the ab-MN first sub-pixels obtained by operation S2020 and the values of the MN second sub-pixels calculated by operation S030, to ultimately convert the super-pixel array having the M×N size into the sub-pixel array having the a×b (a>M, b>N) size, thereby increasing the resolution.

In an exemplary embodiment, when the number of the plurality of driving electrodes is expressed as M+p−1 and the number of the plurality of detection electrodes is expressed as N+q+1, the super-pixel array may have a M×N array, the sub-pixel array may have a (M+p−1)×(N+q−1) array, and a relationship matrix between the plurality of super-pixels in the super-pixel array and the plurality of sub-pixels in the sub-pixel array may have (M×N)×[(M+p−1)×(N+q−1)] array, wherein each of M, p, N, q denotes a natural number that is greater than or equal to 2, M is be greater than p, and N is be greater than q. The image data processing apparatus may drive a p−1 number of driving electrodes among the plurality of driving electrodes and detect signals from a q−1 number of detection electrodes among the plurality of detection electrodes, to obtain first sub-pixel image data having a (M+p−1)×(q−1) array and second sub-pixel image data having a (q−1)×(N+q−1) array; and obtain the values of the sub-pixel array based on the first sub-pixel image data and the second sub-pixel image data.

Figure 21:
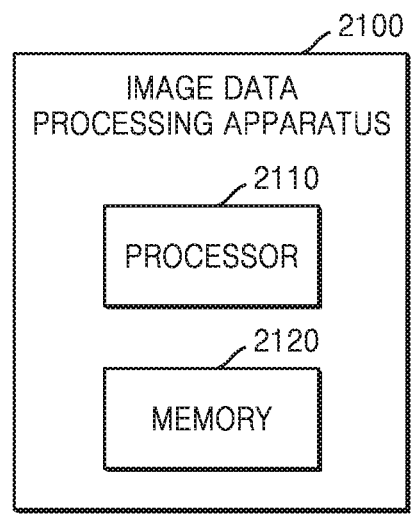
FIG. 21 is a block diagram of hardware components of an image data processing apparatus, according to an exemplary embodiment.

FIG. 21 is a block diagram of hardware components of an image data processing apparatus 2100, according to an exemplary embodiment.

Referring to FIG. 21, the image data processing apparatus 2100 may include at least one processor 2110 and a memory 2120. FIG. 21 illustrates only components of the image data processing apparatus 2100 that are in connection with the present embodiment. Thus, it is obvious to one of ordinary skill in the art that the image data processing apparatus 2100 may further include other general-purpose components, in addition to the components illustrated in FIG. 21. For example, the image data processing apparatus 2100 may further include a sensing circuit, a sensor module, a communication module, an interface, etc.

The image data processing apparatus 2100 may be realized as various types of devices, such as a personal computer (PC), a server device, a mobile device, an embedded device, etc. Also, the image data processing apparatus 2100 may be realized to be connected, in wire or wirelessly, to a PC, a server device, a mobile device, an embedded device, etc. Also, the image data processing apparatus 2100 may be realized as a combination of a device and a server.

The at least one processor 2110 may be realized as a single processor or a plurality of processors. For example, the at least one processor 2110 may be realized as an array of a plurality of logic gates or may be realized as a combination of a general-purpose microprocessor and a memory in which a program to be executed by the microprocessor is stored. For example, the at least one processor 2110 may be realized as a central processing unit (CPU), a graphics processing unit (GPU), an application processor (AP), etc., but is not limited thereto.

The at least one processor 2110 may perform general functions to control the image data processing apparatus 2100. For example, the processor 2110 may execute programs stored in the memory 2120 of the image data processing apparatus 2100 to generally control the image data processing apparatus 2100. Also, the at least one processor 2110 may execute the programs stored in the memory 2120 to perform functions of the image data processing apparatus 2100 in parallel.

The at least one processor 2110 may control a series of processes to convert the image data of the super-pixel array into the image data of the sub-pixel array, described in detail with reference to FIGS. 11 through 20.

The memory 2120 is a hardware component configured to store various data processed in the image data processing apparatus 2100. For example, the memory 2120 may store data processed or to be processed in the image data processing apparatus 2100. Also, the memory 2120 may store applications, drivers, etc., to be driven by the image data processing apparatus 2100. The memory 2120 may include random access memory (RAM), such as dynamic random access memory (DRAM), static random access memory (SRAM), etc., read-only memory (ROM), electrically erasable programmable read-only memory (EEPROM), CD-ROM, bluerays or other optical disk storages, hard disk drive (HDD), solid state drive (SSD), or flash memory.

Also, the memory 2120 may further include an embedded memory shared by the at least one processor 2110 included in the image data processing apparatus 2100 or a plurality of embedded memories configured to support the at least one processor 2110.

Meanwhile, the image data processing apparatus 2100 may further include a sensing circuit. The sensing circuit may include a touch pad, a driver, and a signal receiving unit, but is not limited thereto.

The touch pad may include a plurality of driving electrodes and a plurality of detection electrodes formed in a direction crossing the plurality of driving electrodes. A driver unit may sequentially apply electrical signals to the plurality of driving electrodes, respectively, and sequentially detect electrical signals from the plurality of detection electrodes, respectively. The signal receiving unit may measure electrical signals from the plurality of detection electrodes.

The image data processing apparatus 2100 may control the electrical signals to be applied to the plurality of driving electrodes of the touch pad and control the plurality of detection electrodes to be activated, in order to receive data related to a plurality of super-pixels and a plurality of sub-pixels from the signal receiving unit. The image data processing apparatus 2100 may convert image data of a super-pixel array into image data of a sub-pixel array based on the received data related to the plurality of super-pixels and the plurality of sub-pixels.

According to the one or more of the embodiments of the present disclosure, a method and an apparatus are provided for improving the resolution of image data by converting image data of a super-pixel array into image data of a sub-pixel array.

The one or more embodiments may be embodied as a recording medium, e.g., a program module to be executed in computers, which include computer-readable instructions. The computer storage medium may include any usable medium that may be accessed by computers, volatile and non-volatile media, and detachable and non-detachable media. Also, the computer storage medium may include a computer storage medium and a communication medium. The computer storage medium includes all of volatile and non-volatile media, and detachable and non-detachable media which are designed to store information including computer readable commands, data structures, program modules, or other data. The communication medium includes computer-readable commands, a data structure, a program module, and other transmission mechanisms, and includes other information transmission media.

Also, in this specification, the term "unit" may be a hardware component, such as a processor or a circuit, and/or a software component executed by hardware, such as a processor.

While the present disclosure has been particularly shown and described with reference to exemplary embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the present disclosure is indicated by the claims rather than by the detailed description of the disclosure, and it should be understood that the claims and all modifications or modified forms drawn from the concept of the claims are included in the scope of the present disclosure.

What is claimed is:

1. A method of processing image data generated from a sensing circuit comprising a plurality of driving electrodes and a plurality of detection electrodes, the method comprising:
    obtaining image data of a super-pixel array comprising a plurality of super-pixels by activating a plurality of nodes that are formed at intersections between the plurality of driving electrodes and the plurality of detecting electrodes and included in an activation area of the sensing circuit, and moving the activation area on the sensing circuit by a predetermined pitch in an integrated activation area of the sensing circuit, each of the activation area corresponding to each of the plurality of super-pixels;
    converting the image data of the super-pixel array into image data of a sub-pixel array by:
        obtaining values of a plurality of first sub-pixels included in a first area of the sub-pixel array by separately activating the plurality of nodes in the integrated activation area of the sensing circuit, wherein a plurality of sub-pixels in the sub-pixel array respectively correspond to the plurality of nodes in the integrated activation area; and
        calculating values of a plurality of second sub-pixels included in a second area of the sub-pixel array based on values of the plurality of super-pixels included in the super-pixel array and the values of the plurality of first sub-pixels, the second area corresponding a remaining area of the sub-pixel array outside of the first area,
    wherein, when a number of the plurality of driving electrodes is expressed as M+p−1 and a number of the plurality of detection electrodes is expressed as N+q−1, the super-pixel array has an M×N array, the sub-pixel array has an (M+p−1)×(N+q−1) array, and a relationship between the plurality of super-pixels in the super-pixel array and the plurality of sub-pixels in the sub-pixel array is expressed as an (M×N)×[(M+p−1)×(N+q−1)] array, and
    wherein each of M, p, N, q denotes a natural number that is greater than or equal to 2, M is greater than or equal to p, and N is greater than or equal to q.

2. The method of claim 1, wherein the calculating of the values of the plurality of second sub-pixels comprises:
    determining a size of a relationship matrix representing the relationship between the plurality of super-pixels and the plurality of sub-pixels, based on a number of the plurality of super-pixels included in the super-pixel array and a number of the plurality of sub-pixels included in the sub-pixel array;
    determining the relationship matrix having the determined size, by identifying the plurality of nodes in the activation area, when the activation area is moved in the integrated activation area by the predetermined pitch; and
    calculating the values of the plurality of second sub-pixels based on the super-pixel array, the values of the plurality of first sub-pixels, and the determined relationship matrix.

3. The method of claim 2, wherein the determining of the relationship matrix comprises:
    identifying the plurality of nodes in the activation area by moving the activation area in the integrated activation area by the predetermined pitch;
    determining a plurality of matrix elements of the relationship matrix as a first value, the plurality of matrix elements respectively corresponding to the identified plurality of nodes in the integrated activation area; and determining remaining matrix elements of the relationship matrix, except for the plurality of matrix elements determined as the first value, as a second value.

4. The method of claim 1, wherein the values of the plurality of first sub-pixels are 0.

5. The method of claim 1, wherein the obtaining of the image data of the super-pixel array comprises:

selecting at least one node from among the plurality of nodes in the activation area, the at least one node corresponding to the plurality of second sub-pixels, by moving the activation area in the integrated activation area by the predetermined pitch;

obtaining the plurality of super-pixels by activating only the at least one selected node from among the plurality of nodes in the activation area; and generating the image data of the super-pixel array comprising the obtained plurality of super-pixels.

6. The method of claim 1, wherein the obtaining of the image data of the super-pixel array comprises:

sequentially applying electrical signals to a plurality of driving groups of the plurality of driving electrodes, and sequentially detecting electrical signals from a plurality of detection groups of the plurality of detection electrodes; and obtaining the plurality of super-pixels by activating the plurality of nodes, at which each of the plurality of driving groups and each of the plurality of detecting groups cross each other, and generating the image data of the super-pixel array comprising the plurality of super-pixels.

7. The method of claim 1, wherein the plurality of nodes are formed by the plurality of driving electrodes and the plurality of detection electrodes crossing one another, the plurality of driving electrodes and the plurality of detection electrodes being included in the sensing circuit, and each of the plurality of nodes indicates a mutual capacitance between each of the driving electrodes and each of the detection electrodes.

8. A non-transitory computer-readable storage medium storing a program that is executable by a computer to perform the method of claim 1.

9. An apparatus for processing image data generated from a sensing circuit comprising a plurality of driving electrodes and a plurality of detection electrodes, the apparatus comprising:

a memory storing at least one program; and at least one processor configured to execute the at least one program to control the sensing circuit, wherein the at least one processor is further configured to:

obtain image data of a super-pixel array comprising a plurality of super-pixels by activating a plurality of nodes that are formed at intersections between the plurality of driving electrodes and the plurality of detecting electrodes and included in a activation area of the sensing circuit, and moving the activation area on the sensing circuit by a predetermined pitch in an integrated activation area of the sensing circuit, each of the activation area corresponding to each of the plurality of super-pixels included in the super-pixel array;

convert the image data of the super-pixel array into image data of a sub-pixel array by:

obtaining values of a plurality of first sub-pixels included in a first area of the sub-pixel array by separately activating the plurality of nodes in the integrated activation area of the sensing circuit, wherein a plurality of sub-pixels included in the sub-pixel array respectively correspond to the plurality of nodes in the integrated activation area; and calculating values of a plurality of second sub-pixels included in a second area of the sub-pixel array based on values of the plurality of super-pixels included in the super-pixel array and the values of the plurality of first sub-pixels, the second area corresponding a remaining area of the sub-pixel array outside of the first area, wherein, when a number of the plurality of driving electrodes is expressed as M+p−1 and a number of the plurality of detection electrodes is expressed as N+q−1, the super-pixel array has an M×N array, the sub-pixel array has an (M+p−1)×(N+q−1) array, and a relationship between the plurality of super-pixels in the super-pixel array and the plurality of sub-pixels in the sub-pixel array is expressed as an (M×N)×[(M+p−1)×(N+q−1)] array, and wherein each of M, p, N, q denotes a natural number that is greater than or equal to 2, M is greater than or equal to p, and N is greater than or equal to q.

10. The apparatus of claim 9, wherein the at least one processor is further configured to:

determine a size of a relationship matrix representing the relationship between the plurality of super-pixels and the plurality of sub-pixels, based on a number of the super-pixels included in the super-pixel array and a number of the sub-pixels included in the sub-pixel array;

determine the relationship matrix having the determined size, by identifying the plurality of nodes in the activation area, when the activation area is moved in the integrated activation area by the predetermined pitch; and calculate the values of the plurality of second sub-pixels based on the super-pixel array, the values of the plurality of first sub-pixels, and the determined relationship matrix.

11. The apparatus of claim 10, wherein the at least one processor is further configured to:

identify the plurality of nodes in the activation area by moving the activation area in the integrated activation area by the predetermined pitch;

determine a plurality of matrix elements of the relationship matrix as a first value, the plurality of matrix elements respectively corresponding to the identified plurality of nodes in the integrated activation area; and determine remaining matrix elements of the relationship matrix, except for the plurality of matrix elements determined as the first value, as a second value.

12. The apparatus of claim 9, wherein the values of the plurality of first sub-pixels are 0.

13. The apparatus of claim 9, wherein the at least one processor is further configured to:

select at least one node from among the plurality of nodes in the activation area, the at least one node corresponding to the plurality of second sub-pixels, by moving the activation area in the integrated activation area by the predetermined pitch;

obtain the plurality of super-pixels by activating only the at least one selected node from among the plurality of nodes in the activation area; and generate the image data of the super-pixel array comprising the obtained plurality of super-pixels.

14. The apparatus of claim 9, wherein the at least one processor is further configured to:
- control to sequentially apply electrical signals to a plurality of driving groups of the plurality of driving electrodes, and control to sequentially detect electrical signals from a plurality of detection groups of the plurality of detection electrodes; and
- obtain the plurality of super-pixels by activating the plurality of nodes, at which each of the plurality of driving groups and each of the plurality of detecting groups cross each other, and generate the image data of the super-pixel array comprising the plurality of super-pixels.

15. The apparatus of claim 9, wherein the plurality of nodes are formed by the plurality of driving electrodes and the plurality of detection electrodes crossing one another, the plurality of driving electrodes and the plurality of detection electrodes being included in the sensing circuit, and
- each of the plurality of nodes indicates a mutual capacitance between each of the driving electrodes and each of the detection electrodes.

16. The apparatus of claim 9, wherein the sensing circuit comprises:
- a touch pad comprising the plurality of driving electrodes and the plurality of detection electrodes formed in a direction crossing the plurality of driving electrodes;
- a driver unit configured to apply a driving signal to the plurality of driving electrodes; and
- a signal receiving unit configured to measure an electrical signal from the plurality of detection electrodes,
- wherein the at least one processor is further configured to convert the image data of the super-pixel array into the image data of the sub-pixel array, based on the electrical signal measured by the signal receiving unit.

17. A fingerprint sensor comprising:
- a plurality of driving electrodes;
- a plurality of detection electrodes;
- a plurality of nodes formed at intersections between the plurality of driving electrodes and the plurality of detection electrodes; and
- a processor configured to:
  - obtain values of a super-pixel array by measuring capacitances at a plurality of activated nodes in an activation area, among the plurality of nodes in an integrated activation area while changing the activation area in the integration activation area, each of a plurality of super-pixels in the super-pixel array corresponding to each of the changed activation area; and
  - obtain values of a sub-pixel array based on the values of the super-pixel array, and a relationship matrix indicating a relationship between the plurality of super-pixels in the super-pixel array and a plurality of sub-pixels in the sub-pixel array, the plurality of sub-pixels in the sub-pixel array respectively corresponding to the plurality of nodes in the integrated activation area,
- wherein, when a number of the plurality of driving electrodes is expressed as M+p−1 and a number of the plurality of detection electrodes is expressed as N+q−1, the super-pixel array has an M×N array, the sub-pixel array has an (M+p−1)×(N+q−1) array, and the relationship between the plurality of super-pixels in the super-pixel array and the plurality of sub-pixels in the sub-pixel array is expressed as an (M×N)×[(M+p−1)×(N+q−1)] array, and
- wherein each of M, p, N, q denotes a natural number that is greater than or equal to 2, M is greater than or equal to p, and N is greater than or equal to q.

18. The fingerprint sensor of claim 17, wherein the processor is further configured to determine a size of the relationship matrix based on a number of the super-pixels included in the super-pixel array and a number of the sub-pixels included in the sub-pixel array.

19. The fingerprint sensor of claim 17, wherein the processor is further configured to:
- drive a p−1 number of driving electrodes among the plurality of driving electrodes and detect signals from a q−1 number of detection electrodes among the plurality of detection electrodes, to obtain first sub-pixel image data having a (M+p−1)×(q−1) array and second sub-pixel image data having a (q−1)×(N+q−1) array; and obtain the values of the sub-pixel array based on the first sub-pixel image data and the second sub-pixel image data.

* * * * *